(12) United States Patent
Tsunashima

(10) Patent No.: US 12,236,679 B2
(45) Date of Patent: Feb. 25, 2025

(54) INFORMATION PROCESSING DEVICE AND INFORMATION PROCESSING METHOD

(71) Applicant: SONY GROUP CORPORATION, Tokyo (JP)

(72) Inventor: Nobuhiro Tsunashima, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 349 days.

(21) Appl. No.: 17/775,686

(22) PCT Filed: Oct. 28, 2020

(86) PCT No.: PCT/JP2020/040521
§ 371 (c)(1),
(2) Date: May 10, 2022

(87) PCT Pub. No.: WO2021/100429
PCT Pub. Date: May 27, 2021

(65) Prior Publication Data
US 2022/0398841 A1    Dec. 15, 2022

(30) Foreign Application Priority Data
Nov. 18, 2019  (JP) ................ 2019-208266

(51) Int. Cl.
| | |
|---|---|
| *G06V 20/10* | (2022.01) |
| *G06Q 50/02* | (2012.01) |
| *G06T 7/11* | (2017.01) |
| *G06V 20/17* | (2022.01) |

(52) U.S. Cl.
CPC .......... *G06V 20/188* (2022.01); *G06Q 50/02* (2013.01); *G06T 7/11* (2017.01); *G06V 20/17* (2022.01); *G06T 2207/30188* (2013.01)

(58) Field of Classification Search
CPC ........ G06V 20/188; G06V 20/17; G06T 7/11; G06T 2207/30188; G06Q 50/02
See application file for complete search history.

(56) References Cited

U.S. PATENT DOCUMENTS

| | | | |
|---|---|---|---|
| 4,916,533 A | 4/1990 | Gillies et al. | |
| 9,489,576 B2 * | 11/2016 | Johnson | G06V 10/25 |
| 10,192,185 B2 * | 1/2019 | Tomii | G06Q 50/02 |
| 10,664,702 B2 * | 5/2020 | Albrecht | G06V 20/188 |
| 10,713,768 B2 * | 7/2020 | Berghoefer | G06T 5/30 |
| 10,993,430 B2 * | 5/2021 | Slaughter | G06T 7/0012 |
| 11,062,223 B2 * | 7/2021 | Xu | G06Q 50/02 |

(Continued)

FOREIGN PATENT DOCUMENTS

| | | |
|---|---|---|
| JP | 02-182231 A | 7/1990 |
| JP | 03-272607 A | 12/1991 |

(Continued)

OTHER PUBLICATIONS

International Search Report and Written Opinion of PCT Application No. PCT/JP2020/040521, issued on Dec. 15, 2020, 11 pages of ISRWO.

*Primary Examiner* — Gregory M Desire
(74) *Attorney, Agent, or Firm* — CHIP LAW GROUP

(57) ABSTRACT

Crop detection is performed in image data obtained by capturing an image of a farm field. Then, a row is determined in the image data on the basis of a result of the crop detection. The row is a line in which a crop is planted.

17 Claims, 24 Drawing Sheets

(56) References Cited

U.S. PATENT DOCUMENTS

| | | | |
|---|---|---|---|
| 11,087,132 B2 * | 8/2021 | Baynes | A01B 49/06 |
| 11,430,092 B2 * | 8/2022 | Hirooka | G06T 5/50 |
| 11,676,376 B2 * | 6/2023 | Rao | G06V 10/26 |
| | | | 382/162 |
| 2015/0245565 A1 | 9/2015 | Pilgrim et al. | |

FOREIGN PATENT DOCUMENTS

| | | |
|---|---|---|
| JP | 06-014611 A | 1/1994 |
| JP | 2006-101816 A | 4/2006 |
| JP | 2007-043919 A | 2/2007 |
| JP | 2012-198688 A | 10/2012 |
| JP | 5162890 B2 | 3/2013 |

\* cited by examiner

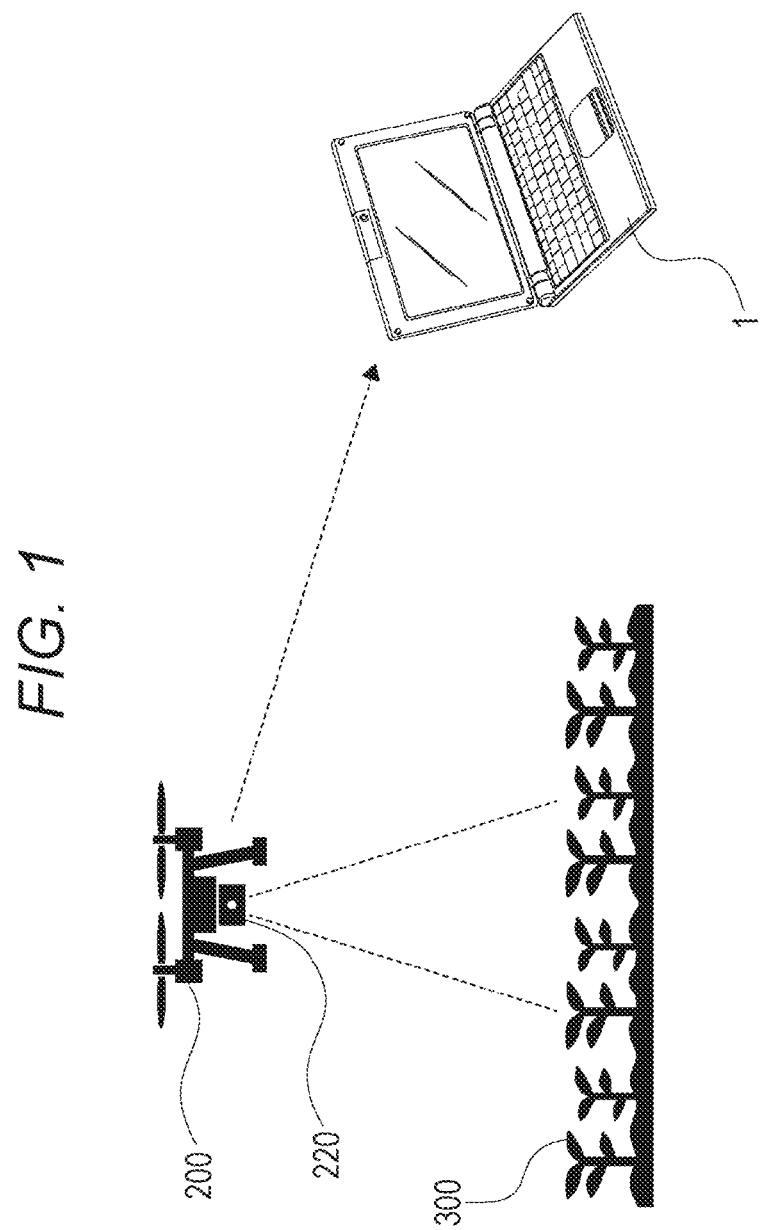

INPUT IMAGE DATA

IMAGE OF CROP-LIKENESS

FIG. 10A
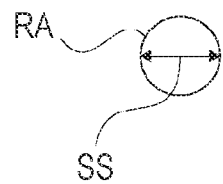
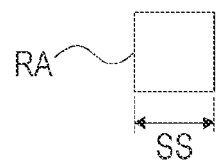
FIG. 10B
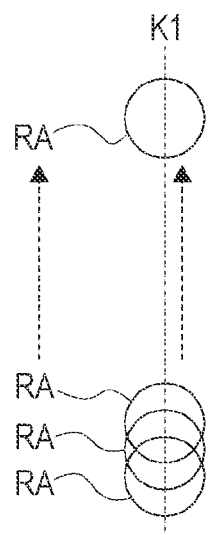
FIG. 10C
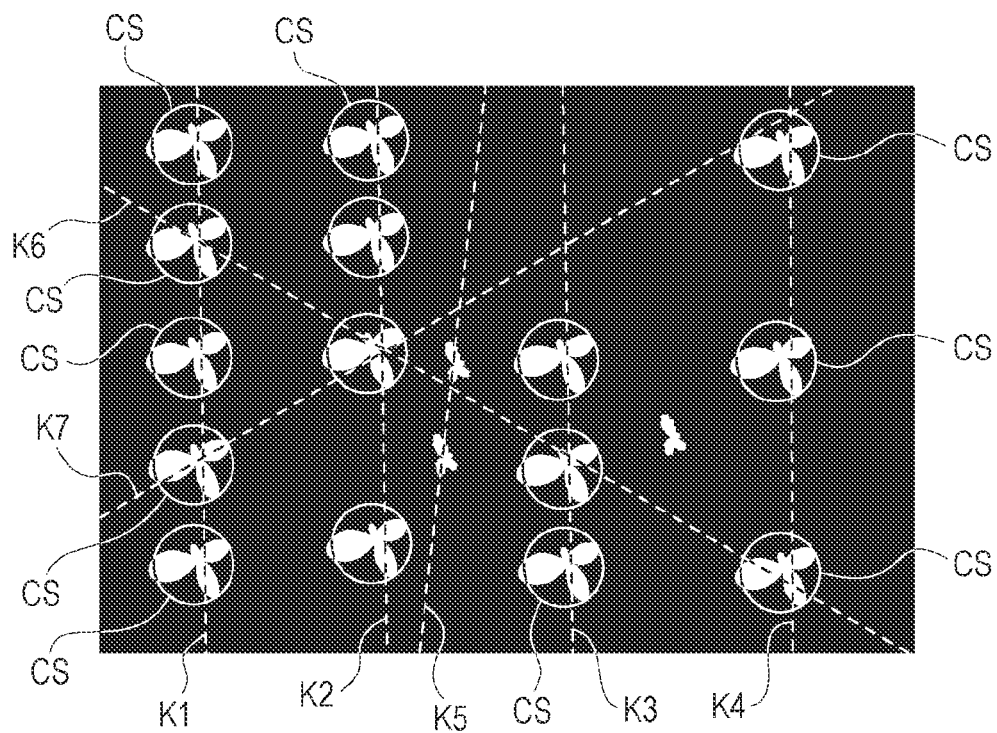

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2020/040521 filed on Oct. 28, 2020, which claims priority benefit of Japanese Patent Application No. JP 2019-208266 filed in the Japan Patent Office on Nov. 18, 2019. Each of the above-referenced applications is hereby incorporated herein by reference in its entirety.

TECHNICAL FIELD

The present technology relates to an information processing device, an information processing method, and a program, and particularly relates to a technology suitable for generating information regarding raising of crops.

BACKGROUND ART

In recent years, automatic planting of crops has been performed due to enlargement of farms. In the automatic planting, it is very important to check whether a crop has been planted correctly or whether the crop has grown as expected. In a case where there is a position where the crop is not planted or grown as expected, replanting or the like may be performed in the position to optimize the final harvest amount.

On the other hand, with development of an image capturing technique from the sky by a camera or the like mounted on a flying object such as a drone, attempts have been made to simplify and automate work by eliminating work of patrolling farmlands by human in a large-scale farm. Detection of a defect in the planting described above is also automated by such aerial image capturing technology.

Patent Document 1 discloses a technique for capturing an image of a farm field and performing remote sensing of a vegetation state.

CITATION LIST

Patent Document

Patent Document 1: Japanese Patent No. 5162890

SUMMARY OF THE INVENTION

Problems to be Solved by the Invention

Incidentally, in order to check the defect of planting, it is only required to count the number of crops from an aerially captured image, but it is difficult to accurately count crops from the aerially captured image.

Furthermore, in a case where counting of crops is performed by image processing, count accuracy can be increased by designating rows (ridges and lines of planting) in an image. However, for this purpose, it is necessary to manually input a field region, a row direction, a row position, and the like, and it takes much labor in a case of processing many images.

Accordingly, the present disclosure proposes a technology that enables easy execution of counting of the number of crops and the like by image processing from an aerially captured image without taking labor.

Solutions to Problems

An information processing device according to the present technology includes a row determination unit that performs crop detection in image data obtained by capturing an image of a farm field, and determines a row that is a line in which a crop is planted in the image data on the basis of a result of the crop detection.

A portion of a crop is detected in image data related to a farm field. On the basis of this, a row in the image data is determined.

In the above-described information processing device according to the present technology, it is conceivable that the row determination unit detects a row candidate on the basis of a result of the crop detection, calculates a certainty as a row on the basis of a crop interval in each row candidate, and determines a row on the basis of a calculation result of the certainty.

A row as an arrangement of the crops can be estimated by detecting a crop-like region as crop detection, and thus the row is set as a row candidate. For each row candidate, a certainty is determined on the basis of the crop interval.

In the above-described information processing device according to the present technology, it is conceivable that the row determination unit calculates a crop size from a size of a crop-like region near an upper portion of a row candidate, detects a crop candidate on the row candidate from a calculated crop size, calculates a crop interval on the image data from an interval between detected crop candidates, determines a certainty of the row candidate from a determined crop interval, and performs processing of determining a row after excluding the row candidate determined to be erroneously detected using a determined certainty.

The crop interval on the image data can be appropriately determined by estimating a growth size from the crop-like region as crop detection. A certainty of row candidates is determined from such a crop interval.

In the above-described information processing device according to the present technology, it is conceivable that the row determination unit determines a row including a curve in the image data.

That is, the row is not limited to a straight line, but a curved or partially curved row is also detected and determined as a row on the image data.

In the above-described information processing device according to the present technology, it is conceivable that the row determination unit sets a row candidate including a curve by dividing the image data, performing row detection for each divided image, and combining lines of the row detection of divided images.

That is, a row of a straight line, a curved line, or a partial curved line can be detected using a short straight line of the divided image.

In the above-described information processing device according to the present technology, it is conceivable to further include an output information generation unit that generates output information regarding growth of a crop by using information of a row determined by the row determination unit.

The output information regarding the growth of the crop is, for example, information that can be used for management of the farm field, such as the number of crops per unit area, predicted harvest amount, and crop ratio.

In the above-described information processing device according to the present technology, it is conceivable that the output information generation unit counts a number of crops in the row determined by the row determination unit, and counts a total number of crops present in image data.

In a case where a row is determined, the number of crops is counted as a plant portion on the row.

In the above-described information processing device according to the present technology, it is conceivable that the output information generation unit counts missing positions of a crop using a crop interval obtained by the row determination unit.

By obtaining the crop interval, it is possible to estimate a missing position as a position where there is no crop that should originally exist.

In the above-described information processing device according to the present technology, it is conceivable that the output information generation unit counts missing positions of a crop using a crop interval obtained by the row determination unit, and calculates a crop ratio that is a ratio between an ideal number of plantings and actual plantings using a counting result of missing positions of the crop.

The ideal number of plantings is the number of crops aggregated in a case where the crops are grown in all positions where seeds are sown. Then, by obtaining the missing positions, the ideal number of plantings is obtained, and thereby a ratio to actual plantings can be obtained.

The crop ratio is a ratio of germinated crops, and can also be rephrased as, for example, a germination ratio or a germination rate.

In the above-described information processing device according to the present technology, it is conceivable that the output information generation unit calculates an effective area of planting on the basis of a position of the row determined by the row determination unit.

The effective area of planting is an area of a range where planting is actually carried out, and is, for example, an area excluding a range where planting is not carried out in the farm field.

In the above-described information processing device according to the present technology, it is conceivable that the output information generation unit calculates representative output information using output information obtained from each of a plurality of pieces of image data.

The representative output information is, for example, an average value, a median value, a centroid value, and the like of those obtained from each of the plurality of pieces of image data with respect to output information such as the number of crops, a harvest amount, and a crop ratio.

In the above-described information processing device according to the present technology, it is conceivable that the output information generation unit detects a set of crops in which a value of an arrangement interval is equal to or less than a predetermined value, and generates output information presenting a corresponding set of crops.

The arrangement interval is an interval between places where crops are growing. Crops having close arrangement intervals are detected, and output information that can be identified on the display is generated, for example.

In the above-described information processing device according to the present technology, it is conceivable that the output information generation unit detects a number of crops in which a value of an arrangement interval is equal to or less than a predetermined value, and calculates a predicted harvest amount reflecting the number.

Because the growth of crops having close arrangement intervals deteriorates, it is not appropriate to calculate the predicted harvest amount by normal counting. Thus, the number of crops having close arrangement intervals is reflected in calculation of the predicted harvest amount.

In the above-described information processing device according to the present technology, it is conceivable that presence of calculated data for the image data of the same farm field is checked, and processing is performed using the calculated data in a case where the calculated data exists.

For example, in a case where there is a plurality of pieces of image data obtained by image capturing by a series of image capturing operations for a certain farm field, or in a case where there is a plurality of pieces of image data obtained by image capturing in substantially the same period, and in a case where there is calculated data such as a crop interval, a growth size, and a row interval calculated for one piece of image data, the calculated data can also be used in row determination processing and output information calculation processing for other image data.

In the above-described information processing device according to the present technology, it is conceivable that in a case where calculated data calculated from the image data is a value outside an allowable range based on representative calculated data obtained for other image data of the same farm field, a value of the representative calculated data is applied.

For example, in a case where there is a plurality of pieces of image data obtained by image capturing by a series of image capturing operations for a certain farm field, or in a case where there is a plurality of pieces of image data obtained by image capturing in substantially the same period, and in a case where a crop interval, a growth size, a row interval, or the like calculated for one piece of image data is far from a value obtained from other image data, a value of representative calculation data such as an average value or a median value is used.

In the above-described information processing device according to the present technology, it is conceivable that an effective range of planting in the image data is determined by using map data of the farm field.

For example, the effective range in the image data is determined using map data of a farm field owned by the farmer.

In the above-described information processing device according to the present technology, it is conceivable to further include a user interface control unit that performs control to present the row determined by the row determination unit and detects a user operation, in which the row determination unit changes the row determination according to a detected user operation.

For example, display of clearly indicating the determined row or the like is performed on the image data, so that the user can check the row.

An information processing method according to the present technology includes performing crop detection in image data obtained by capturing an image of a farm field, and determining a row that is a line in which a crop is planted in the image data on the basis of a result of the crop detection.

Thus, specification of a row that contributes to calculation accuracy of information of crop can be easily achieved in the information processing device without human intervention.

A program according to the present technology is a program that causes an information processing device to execute processes of the above method. Thus, it is easy to achieve a computer device that generates accurate output information without taking time and effort of the user.

BRIEF DESCRIPTION OF DRAWINGS

FIG. 1 is an explanatory diagram of a sensing system according to an embodiment of the present technology.

FIGS. 10A, 10B, and 10C are explanatory diagrams of detection of a crop position on a row according to the embodiment.

MODE FOR CARRYING OUT THE INVENTION

Figure 2B:
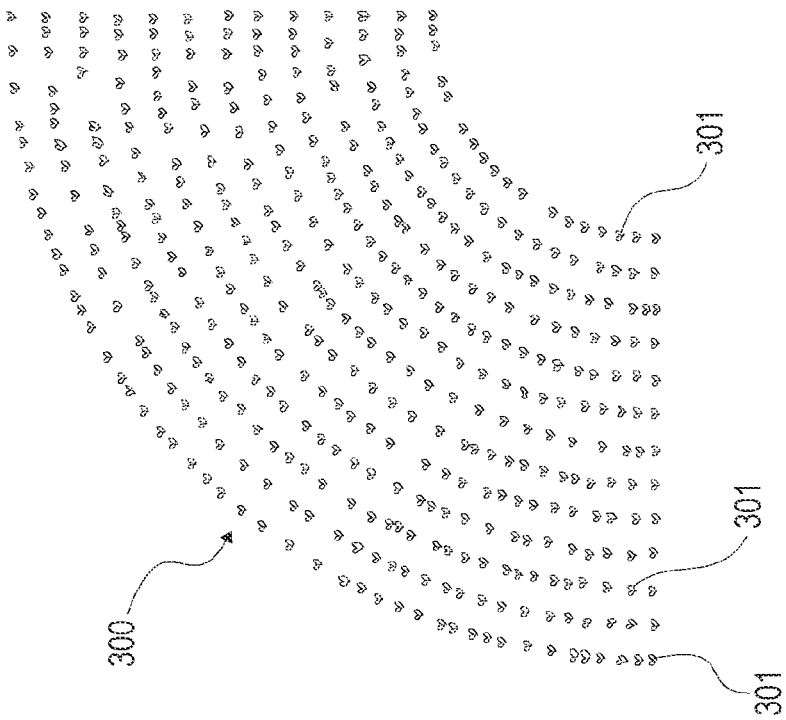
FIGS. 2A and 2B are explanatory diagram of rows and image capturing ranges in a farm field.

Hereinafter, embodiments will be described in the following order.
<1. Configuration of sensing system>
<2. Configuration of information processing device>
<3. Processing of information processing device>
<4. First Embodiment>
<5. Second Embodiment>
<6. Third Embodiment>
<7. Fourth Embodiment>
<8. Fifth Embodiment>
<9. Sixth Embodiment>
<10. Seventh Embodiment>
<11. Eighth Embodiment>
<12. Ninth Embodiment>
<13. Tenth Embodiment>
<14. Summary and modification example>

1. Configuration of Sensing System

First, a sensing system according to an embodiment will be described.

FIG. 1 illustrates an information processing device 1 constituting a sensing system and an imaging device 220 mounted on a small flying object 200 such as a drone for example.

The flying object 200 can move above the farm field 300 by, for example, wireless control by an operator or automatic control or the like.

An imaging device 220 is set in the flying object 200, for example, so as to capture an image of the lower side. When the flying object 200 moves above the farm field 300 on a predetermined route, the imaging device 220 periodically captures still images, for example.

Note that the flying object 200 flies at a relatively low altitude (for example, at an altitude of about 10 m to 20 m), so that one captured image shows a part of the farm field 300.

By capturing still images at short time intervals, a stitching process of each captured image can be performed to obtain a composite image showing the entire farm field. However, in a case of sensing according to the present embodiment, such a process is not necessarily required, and for example, it is only required to capture an image of a discrete region in the farm field 300 as a sensing sample to obtain a plurality of pieces of image data.

As the imaging device 220 mounted on the flying object 200, a visible light image sensor (image sensor for capturing an image of visible light of Red (R), Green (G), and Blue (B)), a camera for capturing a near infrared (NIR) image, a multi-spectrum camera that captures an image of a plurality of wavelength bands, a hyperspectrum camera, a Fourier transform infrared spectroscopy (FTIR), an infrared sensor, and the like are assumed. Of course, a plurality of types of cameras (sensors) may be mounted on the flying object 200.

As the multi spectrum camera, for example, one that captures an NIR image and a red (R) image and can calculate a normalized difference vegetation index (NDVI) from the obtained image is also assumed to be used. The NDVI is a vegetation index indicating plant likeness, and can be used as an index indicating a distribution status and an activity degree of vegetation.

The NDVI can be obtained from the R image and the NIR image. That is, the value of NDVI is obtained as:

$$NDVI=(NIR-R)/(NIR+R)$$

Tag information is added to an image obtained by image capturing by the imaging device 220. The tag information includes image capturing date and time information, position information (latitude and longitude information) as global positioning system (GPS) data, information regarding the flight altitude of the flying object 200 at the time of image capturing, imaging device information (individual identification information, model information, and the like of the camera), information regarding each piece of image data (information such as image size, wavelength, and image capturing parameters), and the like.

Image data captured by the imaging device 220 attached to such a flying object 200 and the tag information are acquired by the information processing device 1.

For example, the image data and the tag information are transferred by wireless communication, network communication, or the like between the imaging device 220 and the information processing device 1. As the network, for example, the Internet, a home network, a local area network (LAN) or the like, a satellite communication network, and other various networks are assumed.

Alternatively, the image data and the tag information are delivered to the information processing device 1 in a mode such that a recording medium (for example, a memory card or the like) attached to the imaging device 220 is read by the information processing device 1 side.

The information processing device 1 uses the image data and the tag information to generate analysis information for the farm field 300 as a measurement target. Furthermore, processing of presenting the analysis result to the user as an image is performed.

Specifically, it is possible to perform counting of crops captured in the image data, and the like, generate information that can be used for management of the farm field, such as the number of crops, the number of crops per unit area, a predicted harvest amount, and a crop ratio for example, on the basis of the counting and the like, and present the information to the user.

The information processing device 1 is achieved as, for example, a personal computer (PC), a field-programmable gate array (FPGA), or a terminal device such as a smartphone or a tablet.

Note that, in FIG. 1, the information processing device 1 is separated from the imaging device 220, but for example, an arithmetic device (a microcomputer or the like) to be the information processing device 1 may be provided in a unit including the imaging device 220.

Here, in a case of the sensing system according to the present embodiment, in particular, a position that is assumed as a "row" in the farm field 300 is automatically determined on the image data, and planted crops are counted on the basis of the determination.

The row is a line in which crops are planted, and for example, a ridge formed for seed planting in the farm field 300 is also a kind of the row. Furthermore, the row is not particularly limited to a row in which soil is raised like a ridge, and a line formed when seeds are sown on flat land is also a row. For example, a planting line formed when sowing is performed by a tractor (seeder) is called a row.

Figure 2A:
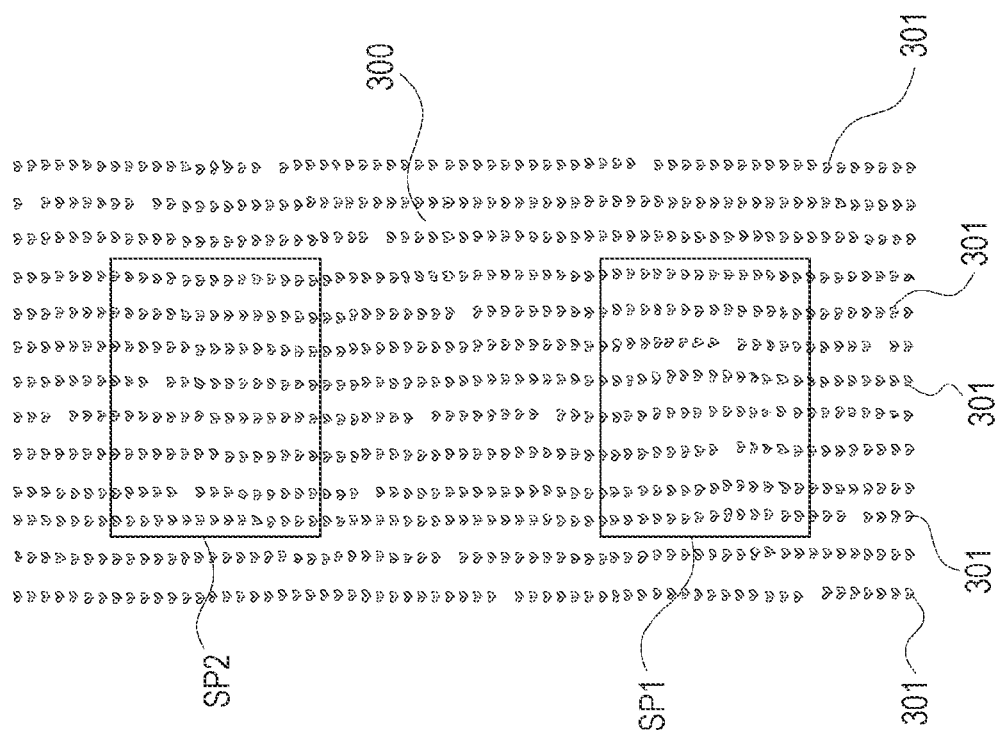

FIG. 2A schematically illustrates rows 301 formed in the farm field 300. For example, a line in which seeds germinate as the date elapses from the sowing and leaves of the crop are arranged as illustrated in the drawing becomes the row 301.

In a case of the present embodiment, the farm field 300 is imaged by the imaging device 220 while the flying object 200 is moving, but each place is imaged at an appropriate timing, for example, as in the image capturing ranges SP1 and SP2 in the diagram. For example, image data in the image capturing range SP1 and image data in the image capturing range SP2 are obtained by the imaging device 220 as a one-frame captured still image, and are each taken into the information processing device 1.

Note that although linear rows 301 are illustrated in FIG. 2A, the row 301 is not necessarily always a straight line. The straight row 301 may bend at an end of the farm field 300 or the like. Furthermore, depending on the shape of the farm field 300, a path at the time of sowing, obstacles, and the like, the row 301 may be partially curved, or the row 301 may be formed in a spiral shape or a concentric shape, for example.

FIG. 2B illustrates a state in which rows 301 curve in this manner.

2. Configuration of Information Processing Device

The information processing device 1 that acquires image data from the imaging device 220 and performs processing in the above sensing system will be described.

Figure 3:
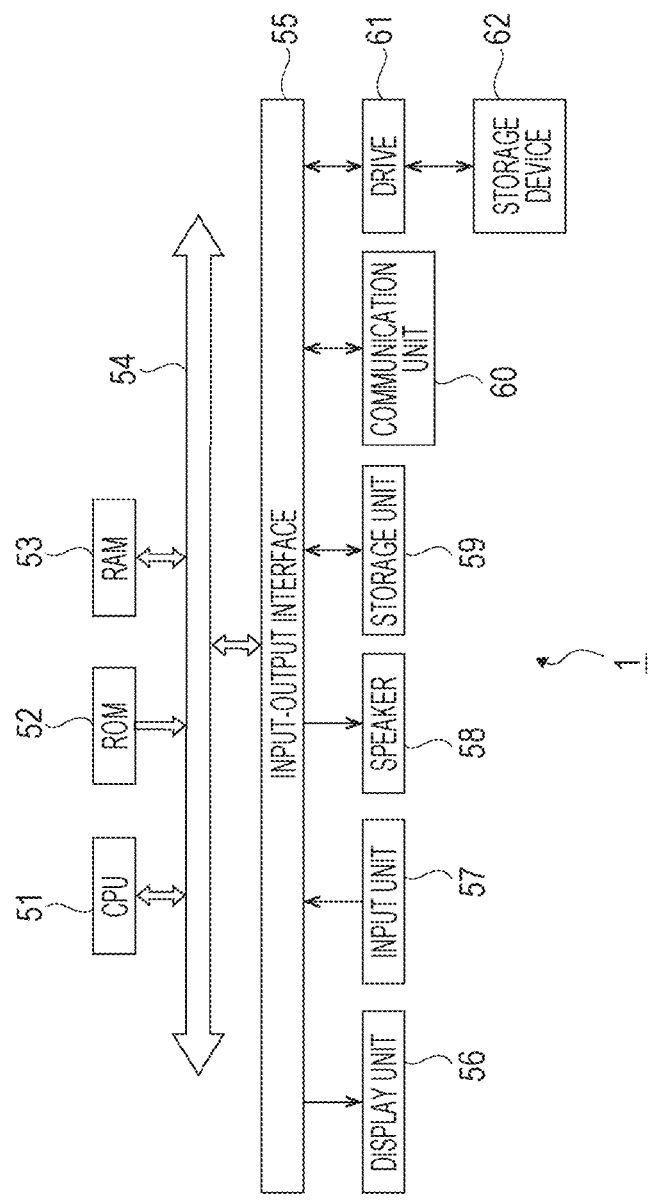
FIG. 3 is a block diagram of a hardware configuration of an information processing device according to the embodiment.

FIG. 3 illustrates a hardware configuration of the information processing device 1. The information processing device 1 includes a central processing unit (CPU) 51, a read only memory (ROM) 52, and a random access memory (RAM) 53.

The CPU 51 executes various processes according to a program stored in the ROM 52 or a program loaded from the storage unit 59 into the RAM 53. The RAM 53 also appropriately stores data and the like necessary for the CPU 51 to execute various processes.

The CPU 51, the ROM 52, and the RAM 53 are connected to one another via a bus 54. An input-output interface 55 is also connected to the bus 54.

A display unit 56 including a liquid crystal panel, an organic electroluminescence (EL) panel, or the like, an input unit 57 including a keyboard, a mouse, or the like, a speaker 58, a storage unit 59, a communication unit 60, or the like can be connected to the input-output interface 55.

The display unit 56 may be integrated with the information processing device 1 or may be a separate device.

In the display unit 56, a captured image, various calculation results, and the like are displayed on a display screen on the basis of an instruction from the CPU 51. Furthermore, the display unit 56 displays various operation menus, icons, messages, and the like, that is, displays as a graphical user interface (GUI) on the basis of an instruction from the CPU 51.

The input unit 57 means an input device used by a user who uses the information processing device 1.

For example, as the input unit 57, various operators and operation devices such as a keyboard, a mouse, a key, a dial, a touch panel, a touch pad, and a remote controller are assumed.

An operation by the user is detected by the input unit 57, and a signal corresponding to the input operation is interpreted by the CPU 51.

The storage unit 59 includes, for example, a storage medium such as a hard disk drive (HDD) or a solid state memory. The storage unit 59 stores, for example, image data captured by the imaging device 220, the tag information, and other various types of information. Furthermore, the storage unit 59 is also used to store program data for various processes.

The communication unit 60 performs communication processing via a network including the Internet and communication with devices of peripheral units.

The communication unit 60 may be, for example, a communication device that communicates with the imaging device 220.

Furthermore, a drive 61 is connected to the input-output interface 55 as necessary, a storage device 62 such as a memory card is attached thereto, and writing and reading of data are performed.

For example, a computer program read from the storage device 62 is installed in the storage unit 59 as necessary, or data processed by the CPU 51 is stored. Of course, the drive 61 may be a recording-reproducing drive for a removable storage medium such as a magnetic disk, an optical disk, or a magneto-optical disk. These magnetic disks, optical disks, magneto-optical disks, and the like are one aspect of the storage device 62.

Note that the information processing device 1 according to the embodiment is not limited to the single information processing device (computer device) 1 having the hardware configuration as illustrated in FIG. 3, and may be configured by systematizing a plurality of computer devices. The plurality of computer devices may be systematized by a LAN or the like, or may be arranged in a remote place by a virtual private network (VPN) or the like using the Internet or the like. The plurality of computer devices may include computer devices available by cloud computing services.

Furthermore, the information processing device 1 in FIG. 3 can be achieved as a personal computer such as a stationary type or a notebook type, or a portable terminal such as a tablet terminal or a smartphone. Moreover, the information processing device 1 according to the present embodiment can also be mounted in an electronic device such as a measurement device, a television device, a monitor device, an imaging device, or an equipment management device having a function as the information processing device 1.

Figure 4:
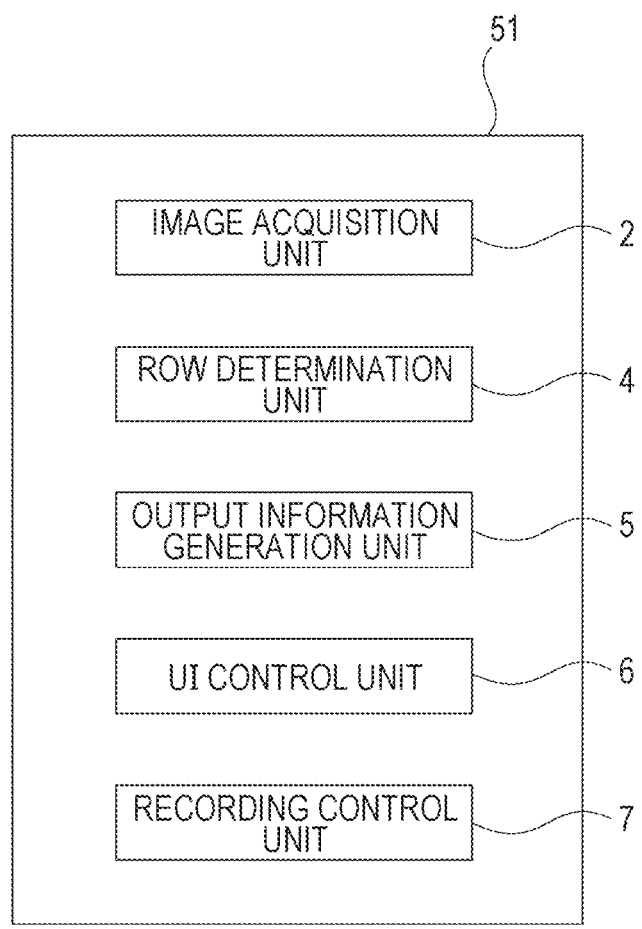
FIG. 4 is an explanatory diagram of a functional configuration of the information processing device according to the embodiment.

For example, the information processing device 1 having such a hardware configuration has a calculation function by the CPU 51, a storage function by the ROM 52, the RAM 53, and the storage unit 59, a data acquisition function by the communication unit 60 and the drive 61, and an output function by the display unit 56 or the like, and the installed software functions to have a functional configuration as illustrated in FIG. 4.

That is, the information processing device 1 includes an image acquisition unit 2, a row determination unit 4, an output information generation unit 5, a user interface control unit 6 (hereinafter, "user interface" will be referred to as "UI"), and a recording control unit 7 illustrated in FIG. 4.

These processing functions are implemented by software activated by the CPU 51.

The program constituting the software is downloaded from the network or read from the storage device 62 (for example, a removable storage medium) and installed in the information processing device 1 of FIG. 3.

Alternatively, the program may be stored in advance in the storage unit 59 or the like. Then, when the program is activated in the CPU 51, the functions of the above respective units are expressed.

Furthermore, the calculation progress and the result of each function are stored using, for example, a storage area of the RAM 53 or a storage area of the storage unit 59.

The image acquisition unit 2 is a function of acquiring image data as a processing target and tag information accompanying the image data. For example, image data captured by the imaging device 220 is stored in the storage unit 59 or the like, and the CPU 51 reads specific image data to be subjected to calculation processing.

The row determination unit 4 is a processing function that performs crop detection in image data obtained by capturing an image of the farm field 300, that is, image data that is a processing target of the image acquisition unit 2, and determines the row 301 (that is, a portion where the row 301 is included in the image) in the image data on the basis of a result of the crop detection.

The output information generation unit 5 is a function of performing calculation to generate information indicating a state of the farm field 300.

For example, the output information generation unit 5 calculates the number of crops per unit area (for example, one acre), the predicted harvest amount, the crop ratio, and the like on the basis of the count of crops included in the image data and the count number of crops.

The UI control unit 6 is a function of performing, for example, display control of the display unit 56, acquisition processing of operation information input by the input unit 57, and the like. That is, the UI control unit 6 performs presenting an image and information calculated by the output information generation unit 5, recognizing a user operation, and the like.

The recording control unit 7 is a function of controlling storage of information calculated by the output information generation unit 5 and the like in the storage unit 59.

Note that the information such as the number of crops, the predicted harvest amount, and the crop ratio calculated by the output information generation unit 5 may be transmitted to the external device by the communication unit 60 in addition to being stored in the storage unit 59. In this sense, the information processing device 1 may have, although not illustrated, a function as a communication control unit that transmits the output information calculated by the output information generation unit 5.

3. Processing of Information Processing Device

A basic processing example of the information processing device 1 will be described with reference to FIG. 5.

Figure 5:
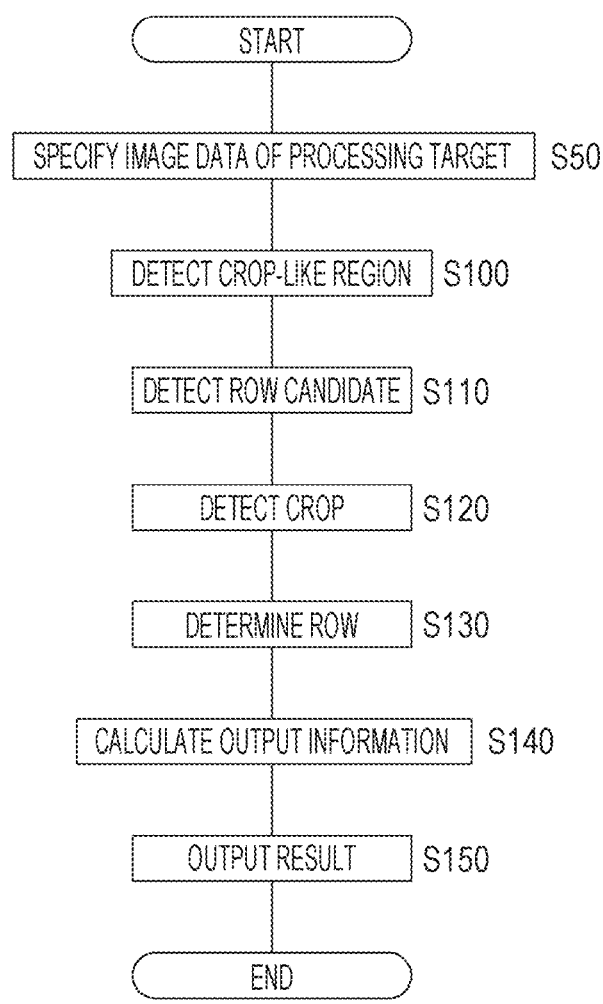
FIG. 5 is a flowchart illustrating a series of processing of the information processing device according to the embodiment.

FIG. 5 illustrates a series of processes of the CPU 51 performing necessary arithmetic processing on image data as a processing target and generating and outputting output information. The processes are achieved by the CPU 51 having the functions illustrated in FIG. 4. That is, step S50 is a process by the function of the image acquisition unit 2, steps S100 to S130 are processes by the function of the row determination unit 4, step S140 is a process by the function of the output information generation unit 5, and step S150 is a process by the function of the UI control unit 6 (alternatively, the recording control unit 7 or the communication control unit that is not illustrated).

In step S50, the CPU 51 specifies image data as a processing target.

In step S100, the CPU 51 detects a crop-like region in the image for the image data as the processing target.

In step S110, the CPU 51 detects a position estimated to be a row in the image as a row candidate. The row candidate is detected using a detection result of the crop-like region detected in step S100.

In step S120, the CPU 51 detects a crop in the row candidate. In this case, the crop is detected to determine the interval.

In step S130, the CPU 51 determines a row in the image.

In step S140, the CPU 51 performs processing of calculating output information. For example, the number of crops in the image, the number of crops per unit area, the crop ratio, the predicted harvest amount, and the like are calculated.

In step S150, the CPU 51 performs processing of outputting calculated output information. For example, the processing is processing of displaying the output information on the display unit 56, recording the output information in the storage unit 59 or the storage device 62, or transmitting the output information to an external device by the communication unit 60.

A specific example of the series of processes as illustrated in FIG. 5 will be described below as first to tenth embodiments.

Note that in the description of the processing of each embodiment, the same step numbers are assigned to processes similar to described processes, and redundant description is avoided.

4. First Embodiment

A processing example of FIG. 6 will be described as a specific example of processes of FIG. 5. This illustrates a detailed example of processes of steps S120 and S140 in FIG. 5. Furthermore, each process of steps S50, S100, S110, S130, and S150 will be described in detail.

In step S50, the CPU 51 specifies one piece of the image data obtained by aerial image capturing by the imaging device 220 mounted on the flying object 200 as a processing target. The image data in this case may be color image data by the RGB (red, green, blue) camera or image data as IR (near infrared) data and R (red) data. The image data may be the above-described NDVI image data obtained from IR (near infrared) data and R (red) data.

In step S100, the CPU 51 detects a crop-like region in the image for the image data.

For example, G pixel detection will be described as a detection method in a case where an image captured by an RGB camera is used.

Since the crop mainly includes leaves, and the leaves are generally green, a green region is detected from the RGB color image. For the detection of the green region, for example, it is only required to compare each of RGB components in a certain pixel in the image, and detect only a pixel having a highest G (green).

Alternatively, RGB is converted into spaces of lightness, saturation, and hue such as HSV. Then, by providing a region having a width in green of the hue value, a pixel having a hue in the region may be detected.

Next, threshold detection for an NDVI image will be described as a detection method in a case of using an image obtained by capturing near-infrared light and red.

NDVI, which is an index indicating the distribution of crops (plants), is calculated from near-infrared and red and takes a value range of ±1, and crops have a high NDVI value, and soils and the like have low NDVI. Accordingly, an NDVI image is created from the IR data and the R data, and crop-like pixels are detected by threshold processing.

Note that, in a case where an NDVI image already exists, the NDVI image is acquired in step S50 as described above, and in step S100, it is only required to detect crop-like pixels by threshold processing.

While the crop-like region may be detected only by any one of the above processes, two of the processes described above (G pixel detection and threshold detection for an NDVI image) may be selected according to the type of information included in the input image, and then a crop-like region may be detected.

Figure 7A:
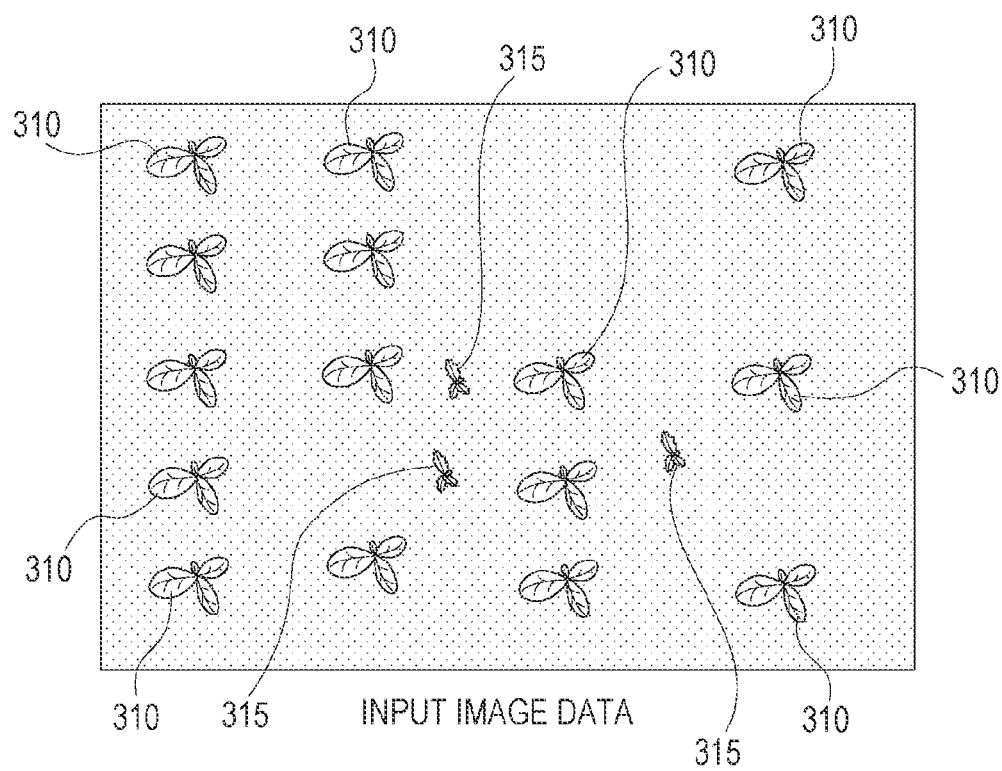
FIGS. 7A and 7B are explanatory diagrams of an image indicating crop likeliness according to the embodiment.

For example, let us consider a case where an image as illustrated in FIG. 7A is input as a processing target.

The image of FIG. 7A is an image in which the crops 310 are planted side by side in rows, but is an image in which there are some missing parts (positions where the crops 310 should be but are not present), and plants other than the crops such as the weeds 315 are present in parts other than the row.

Figure 7B:
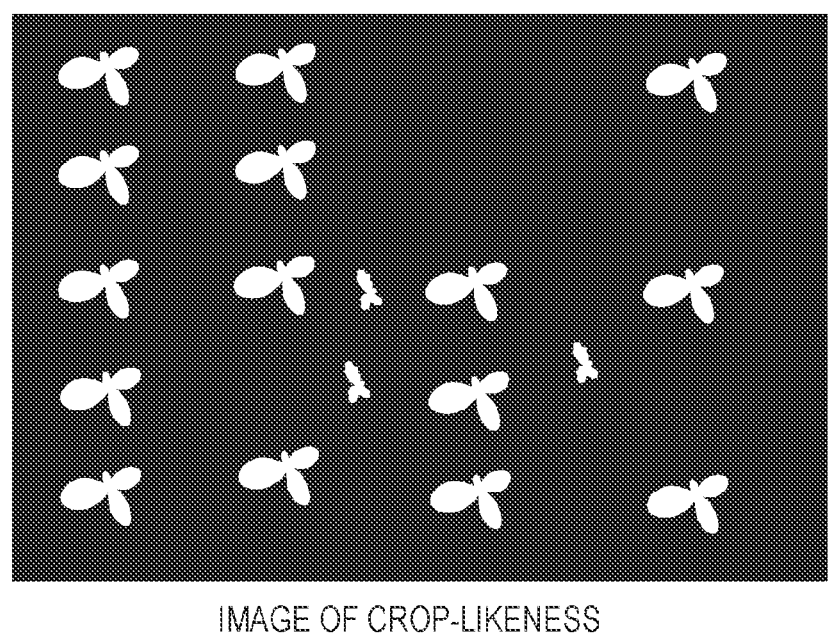

Then, as illustrated in FIG. 7B, a detection result of the crop-like region obtained as the G pixel detection or the threshold detection for the NDVI image described above is expressed by binary values of like crop (white) or unlike crop (black) for each pixel in the image having the same size as the input image. While the white pixel portion is a pixel region in which a plant is imaged, in this case, not only the crop 310 but also a portion of the weed 315 is regarded as a crop-like region.

Note that a plurality of the above thresholds for obtaining such a result may be set instead of one.

For example, two thresholds for the NDVI value may be set, and three values may be set with "unknown whether like crop or not" in addition to two types of "like crop" or "unlike crop".

Furthermore, because a visible line does not actually exist, the row does not appear in the image like FIG. 7A, but in this case, a line along which the crops 310 are arranged in a vertical direction in the drawing is the row. Needless to say, the row may be physically visible by a ridge or the like.

Thereafter, the CPU 51 performs processing of searching for a row in the image.

In step S110, the CPU 51 detects row candidates.

The row is generally a straight line, and thus a straight line of the arrangement of the crops 310 in the image is detected. For detection of a straight line, Hough transform, random sample consensus (RANSAC), or the like is used.

A straight line passing through the crop-like pixels (white pixel portions in FIG. 7B) described above is detected as a row candidate. The number and direction of rows are unknown, and thus all row-like straight lines in the image as indicated by a broken line K1 to a broken line K7 in FIG. 8 are detected as row candidates.

Next, in step S121, the CPU 51 calculates the crop size.

First, for a straight line of a certain row candidate, crop-like pixels near the straight line are projected along the straight line. Specifically, an arbitrary straight line parallel to the straight line of the row candidate is assumed, and the number of crop-like pixels on the straight line is counted. Thus, it is possible to obtain a distribution of the crop-like pixels with respect to a direction perpendicular to the straight line of the row candidate.

Figure 8:
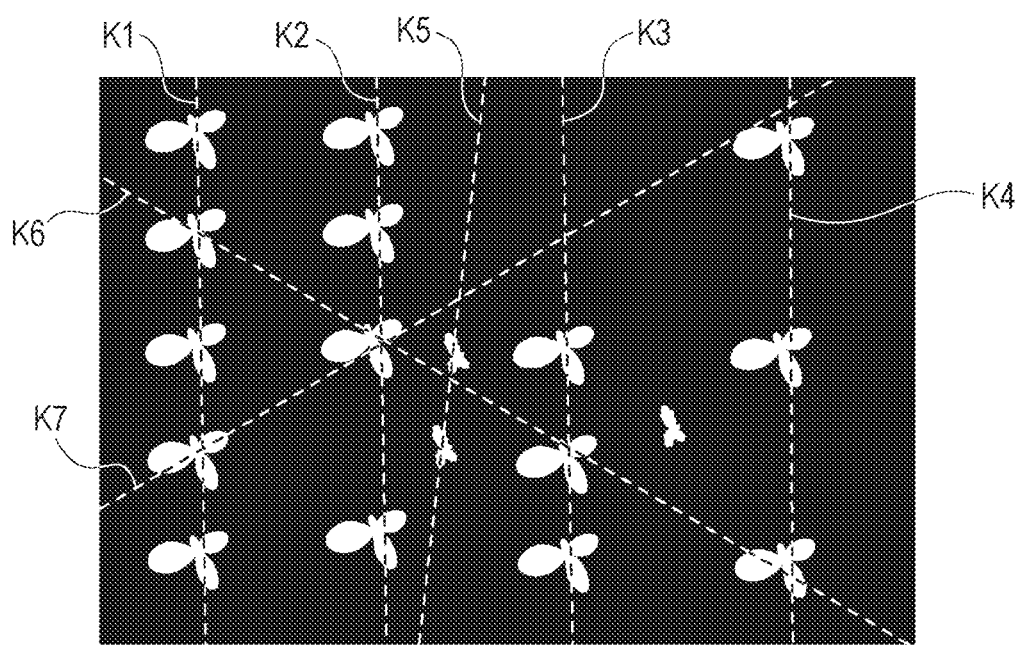
FIG. 8 is an explanatory diagram of row candidates according to the embodiment.
Figure 9:
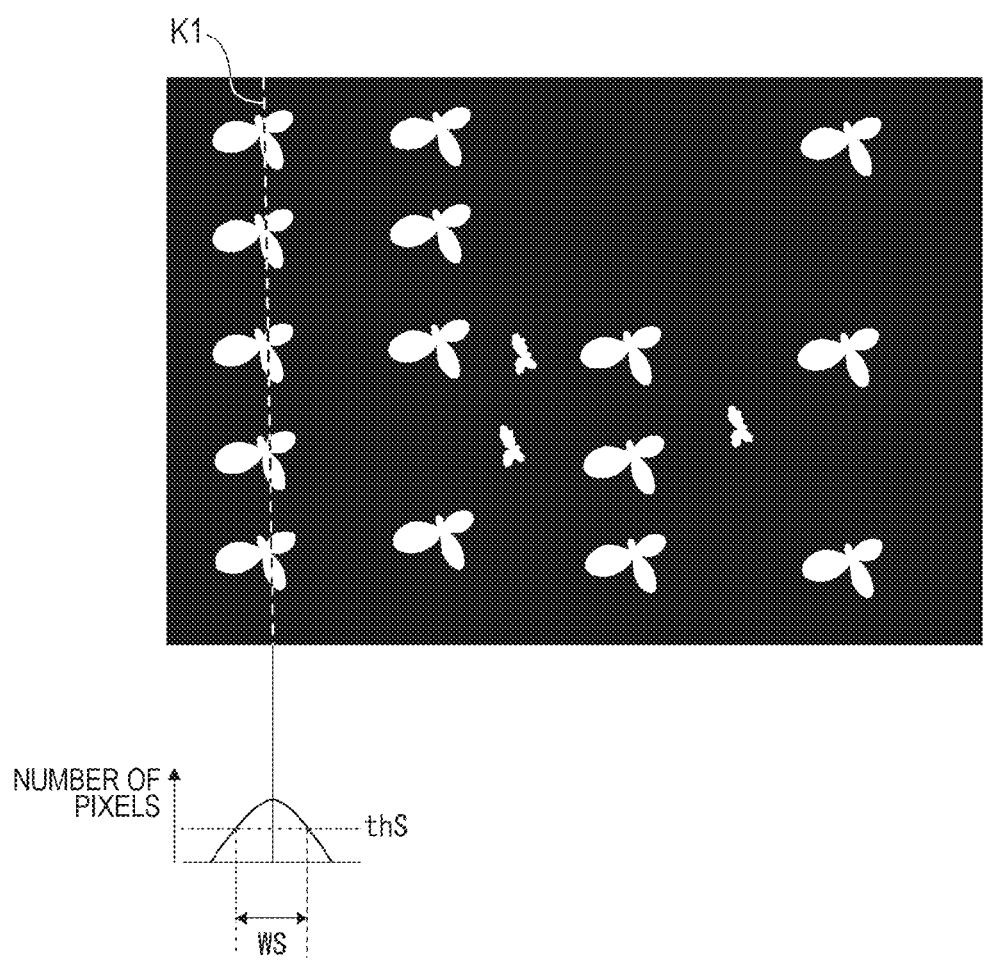
FIG. 9 is an explanatory diagram of projection calculation of a straight line of a row candidate according to the embodiment.

FIG. 9 illustrates an example in which a projection of the straight line of the row candidate indicated by the broken line K1 at the left end of FIG. 8 is calculated. The straight line of the row candidate is detected so as to pass through the crop-like pixels, and thus this distribution becomes highest near the center and decreases as it separates from the center. Then, a certain threshold thS is set for this distribution, and a width WS equal to or larger than the threshold is estimated as the crop size. The threshold thS may be, for example, half the median value.

Such processing is performed on the straight lines (the broken line K1 to the broken line K7) of all row candidates, and the crop size is calculated (estimated).

Since the crops planted in the same period are considered to have substantially the same size, a value such as an average value or a median value of calculated crop sizes of all the row candidates are determined as the crop size SS.

Alternatively, all projections of crop-like pixels near the straight line of any row candidate may be summed, and the crop size SS may be uniquely determined by threshold processing.

Next, in step S122, the CPU 51 detects a crop position on the row.

In this case, first, a reference area RA is set on the row according to the calculated crop size. FIG. 10A illustrates an example of the reference area RA. The reference area RA may be, for example, a circular area having the crop size SS as a diameter or a square area having the crop size SS as one side. Of course, other shapes may be used.

The crop positions are sequentially determined while moving the reference area RA along the straight line of the row candidate (the broken line K1 to the broken line K7 in FIG. 10C). For example, while the reference area RA is moved along the broken line K1 as illustrated in FIG. 10B, it is determined whether or not each portion of the reference area RA is a crop position. For example, the number of crop-like pixels in the reference area RA is counted, and in a case where the number of counts is a certain threshold thC or more, the position of the reference area RA is determined as a crop position CS. The threshold thC in this case is only required to, for example, half, ⅔, or the like of the area of the reference area RA.

FIG. 10C illustrates an example in which the crop position CS on the row candidate is detected.

Next, in step S123, the CPU 51 determines a crop interval on the row. In the input image as a processing target, in a case where it is considered that crops are planted at equal intervals on an arbitrary row, a crop interval on the image is determined.

First, in a straight line of an arbitrary row candidate, a distance to an adjacent crop site is calculated for the crop position CS detected in the above-described processing. In all the crop positions CS, the distance to the adjacent crop position CS is calculated, and an average value, a median value, or the like thereof is determined as the crop interval in the image as a processing target.

Next, in step S124, the CPU 51 calculates a certainty for each of the row candidates (the broken line K1 to the broken line K7).

Since the crops are evenly planted on the correct row, the number of sets of crops planted at the correct crop interval is counted using the calculated crop interval.

The "set of crops" refers to two adjacent crops, and corresponds to two adjacent crop positions CS in the processing in this case. That is, the number of sets of the two crop positions CS having the correct crop interval is counted.

In the determination as to whether the crop interval is correct, it is assumed that the distance between the crops is within an error range with respect to the crop interval described above. As the error range here, for example, 20% or the like is set in advance.

Figure 11A:
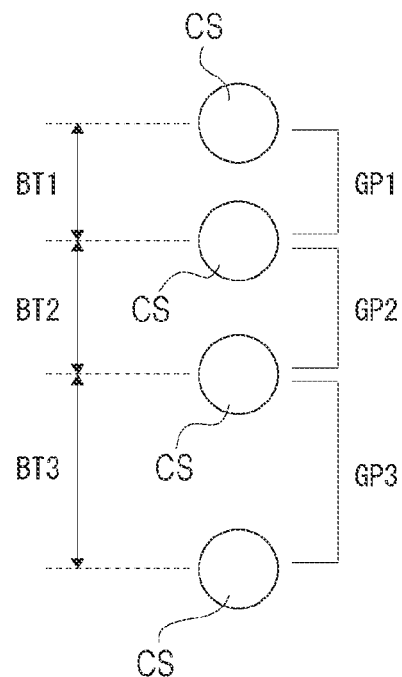
FIGS. 11A and 11B are explanatory diagrams for narrowing down row candidates according to the embodiment.

For example, FIG. 11A illustrates four crop positions CS, and in this case, three sets GP1, GP2, and GP3 exist as "sets of crops". Here, when crop intervals of the respective sets GP1, GP2, and GP3 are distances BT1, BT2, and BT3, if the distances BT1 and BT2 are correct crop intervals and the distance BT3 is an incorrect crop interval, the number of sets of crops having the correct crop intervals is "2".

As described above, the CPU 51 calculates the number of sets of crops planted at the correct crop intervals for each row candidate, and sets the value as a value of certainty of the row candidate. One with a larger value of the certainty is defined as row-like.

Next, in step S130, the CPU 51 determines a correct row among the row candidates. For example, processing in the following procedures (P1) to (P3) are performed.

(P1) Since the rows basically do not intersect, two intersecting row candidates are searched, and a row candidate having a lower certainty among the two row candidates is deleted.

This process is repeated until there is no intersecting row candidate.

(P2) An inclination of the line of each row candidate left in the processing (P1) above is calculated, and an average value, a median value, or the like thereof is obtained as an inclination of the row of the entire image. Since the rows are arranged in parallel, a row candidate having an inclination deviated from the obtained inclination of the row by an allowable range or more is deleted. Note that the allowable range of deviation is set in advance as, for example, an angle difference of ten degrees or less.

(P3) The row interval is calculated from an average value or a median value of intervals of the narrowed row candidates. Then, among the respective row candidates left in the processes of (P1) and (P2) above, a row candidate having an interval (for example, 80% or less of the row interval) closer than the calculated row interval is deleted as a row candidate having a low certainty.

Figure 11B:
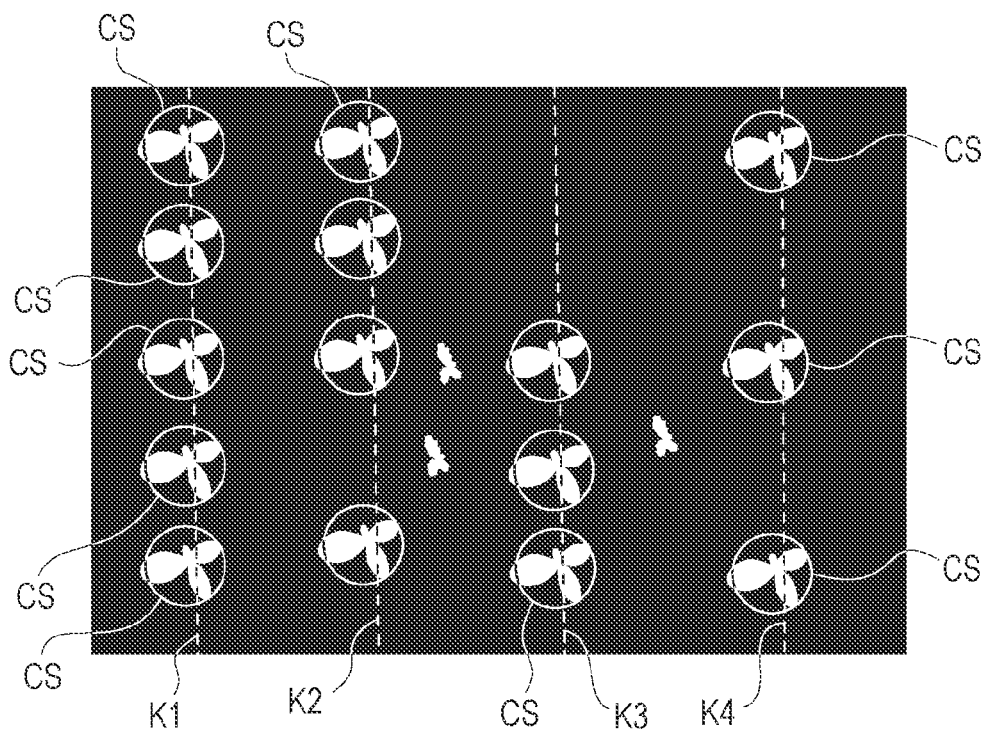

Through such processing, for example, as illustrated in FIG. 11B, row candidates indicated by broken lines K1, K2, K3, and K4 remain as probable row candidates. In this case, not only crossed row candidates are removed, but also erroneous row candidates detected by weeds or the like are removed.

The CPU 51 determines these remaining row candidates as rows in the image.

In step S141, the CPU 51 aggregates the number of crop positions CS on the straight line determined as the row, and sets the number as the number of crops in the image as a processing target.

Since the row has been detected, it is possible to distinguish between a plant that randomly grows outside the row, such as a weed, and a crop that grows on the row, and thus it is possible to accurately count the number of crops.

In step S150, the CPU 51 performs processing of outputting the aggregated number of crops as output information. For example, the CPU 51 performs processing of displaying information of the number of crops on the display unit 56, recording the information in the storage unit 59 or the storage device 62, or transmitting the information to an external device by the communication unit 60.

Furthermore, the CPU 51 may output, as the auxiliary information, information obtained before the number of crops is calculated, such as the number and position of rows and the crop position CS.

Note that the above counting of the number of crops is the counting of the number of crops included in the image data as a processing target, and thus the total number varies depending on the area of the image capturing range. For example, the count greatly varies depending on the altitude of the flying object 200, the angle of view of the imaging device 220, and the like.

Accordingly, it is also effective to convert the counted number of crops into the number of crops per unit area. For example, values of a flight altitude and an angle of view at the time of image capturing are acquired from tag information acquired together with image data, and an area of an image capturing range of image data as a processing target is calculated. Then, a ratio between the calculated area of the image capturing range and the unit area (for example, one acre) is obtained, and the number of crops per unit area can be obtained by multiplying the number of counts by a coefficient corresponding to the ratio. In step S150, the CPU 51 may output information of the number of crops per unit area.

5. Second Embodiment

In the first embodiment described above, the number of crops in the image is used as the output information, but the number of crops may be difficult to handle because of its dependence on the area of the image capturing range.

Accordingly, the crop ratio that does not depend on the area of the image capturing range is calculated. The crop ratio referred to herein is represented by a ratio between an ideal number of plantings and an actual number of plantings in a case where planting is performed according to a constant rule (for example, a width between rows is an equal interval, a crop interval on the rows is an equal interval, and the like). For example, Crop ratio=(actual number of plantings)/(ideal number of plantings)

can be defined. Therefore, it can also be referred to as a germination rate.

Since the number of crops detected in the first embodiment is the actual planting number (the number of germinated crops), it is necessary to obtain the ideal number of plantings in order to obtain the crop ratio.

The ideal number of plantings can be calculated if the width between the rows and the crop interval on the rows are known.

Figure 6:
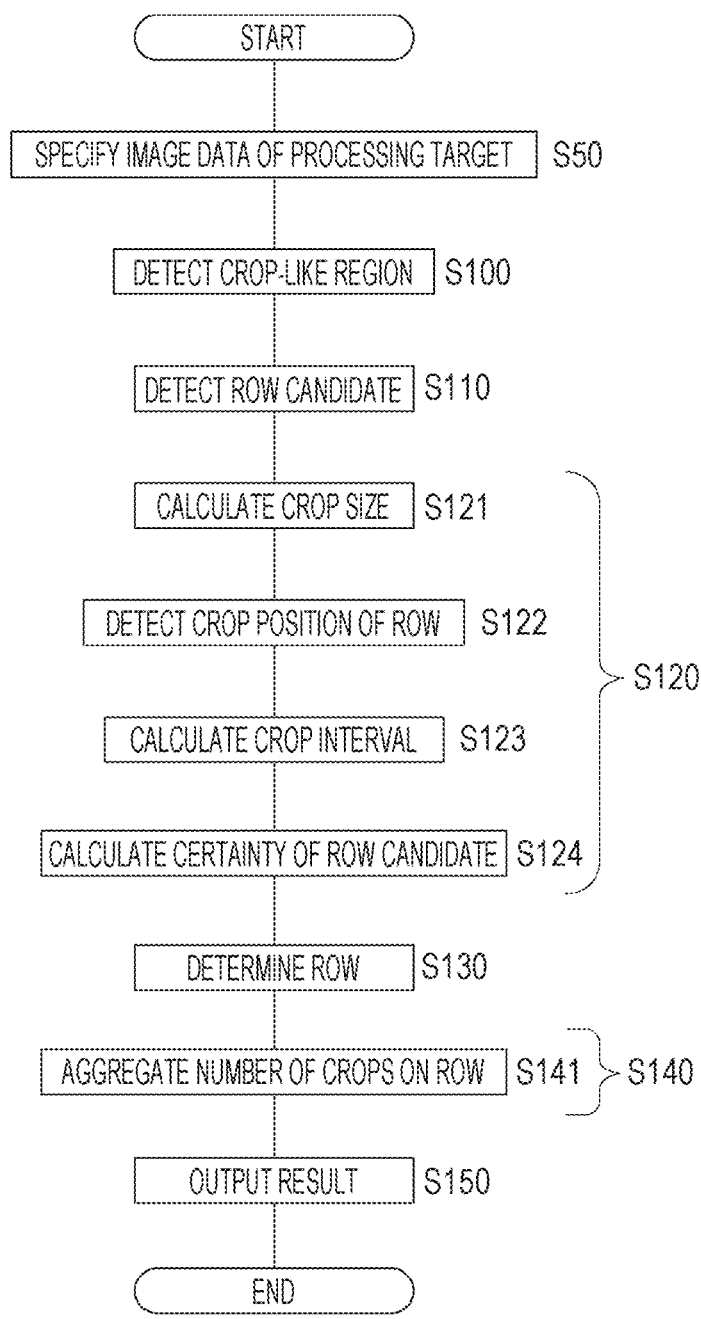
FIG. 6 is a flowchart of a processing example of the first embodiment.

Assuming that the processing from step S121 to step S123 in FIG. 6 is performed in step S120 in FIG. 5, since the crop interval is calculated, for example, in a case where the crop ratio is calculated in step S140 in FIG. 5, the already obtained value of the crop interval can be used to calculate the ideal number of plantings.

Since the ideal number of plantings is a state in which crops are observed in all positions of each crop interval on the row, if the number of positions of each crop interval is counted on the image, this number is the ideal number of plantings. The number of crops actually counted with respect to the ideal number of plantings is the crop ratio, and for example, the crop ratio as "what percentage it is made" or the like can be obtained.

However, in a case where there is an error in the width between rows and the crop interval, the influence of the error increases because the ideal number of plantings is obtained by integrating these two values. Accordingly, in order to reduce the influence of the error, the crop ratio may be calculated by the procedure illustrated in FIG. 12.

Figure 12:
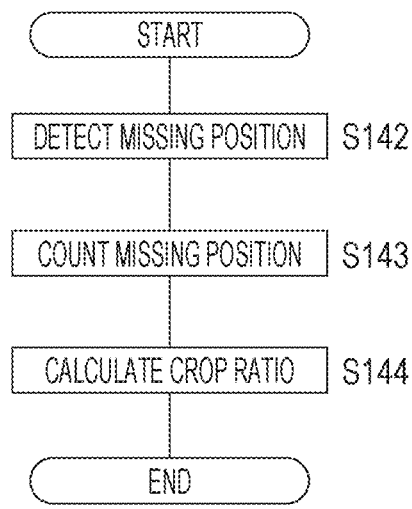
FIG. 12 is a flowchart of a processing example of a second embodiment.

A process of FIG. 12 is, for example, a process executed by the CPU 51 as one of output information calculations in step S140.

First, in step S142, the CPU 51 detects a missing position of the crop.

The ideal number of plantings may be obtained by adding, to the detected actual number of crops, the number of missing positions where there is no crop at a position where there should originally be a crop. The number of missing positions is obtained as follows.

In a case where the interval between the crops adjacent to each other on the row is sufficiently longer than the crop interval calculated by the image processing as described in the first embodiment, it is considered that there is a missing position therebetween. Accordingly, if the interval between the adjacent crops is "d" and the calculated crop interval is "D", the number n of missing positions is expressed by the following equation.

$$n=(d-(d \% D))/D-1 \quad (1)$$

It is assumed that the operator "%" is such that a % b is to calculate a remainder when a is divided by b. Using Equation (1), when the interval between the adjacent crops is twice the calculated crop interval, n=1 holds, and it is calculated that there is one missing position.

Furthermore, because the interval between the adjacent crops cannot be defined at the end portion of the row line on the image, temporary crops are arranged at intersections of the row and an image end, the interval between the temporary crops and the adjacent crops is obtained, and the total number of missing positions is calculated using Equation (1).

Figure 13:
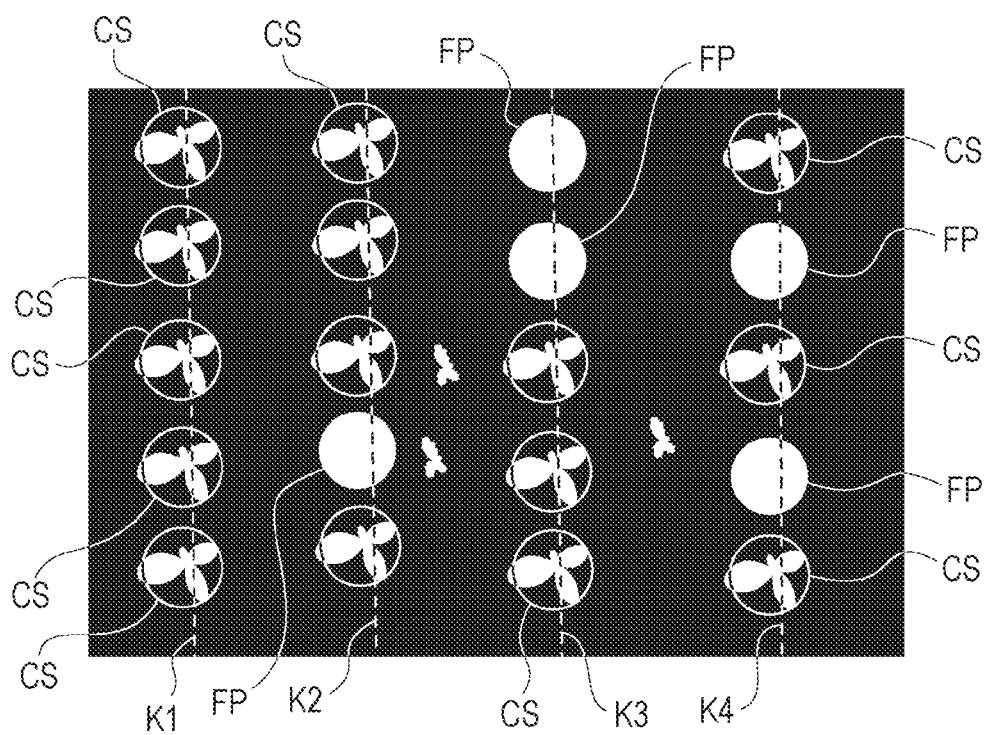
FIG. 13 is an explanatory diagram of a missing position according to the second embodiment.

FIG. 13 illustrates missing positions FP detected on the image as a processing target.

In step S143 of FIG. 12, the CPU 51 adds up the number of missing positions FP on all rows in the image data as a processing target.

Since the number (N) of missing positions FP and the number (P) of crops have been known, the ideal number of plantings is obtained as P+N.

Then, the CPU 51 can obtain the crop ratio R by the following equation in step S144.

$$R=P/(P+N)\times100[\%] \quad (2)$$

In step S140, the CPU 51 calculates such a crop ratio R as one piece of output information, and outputs the crop ratio R in step S150.

6. Third Embodiment

As a third embodiment, a method for obtaining an effective area of planting will be described.

Figure 14:
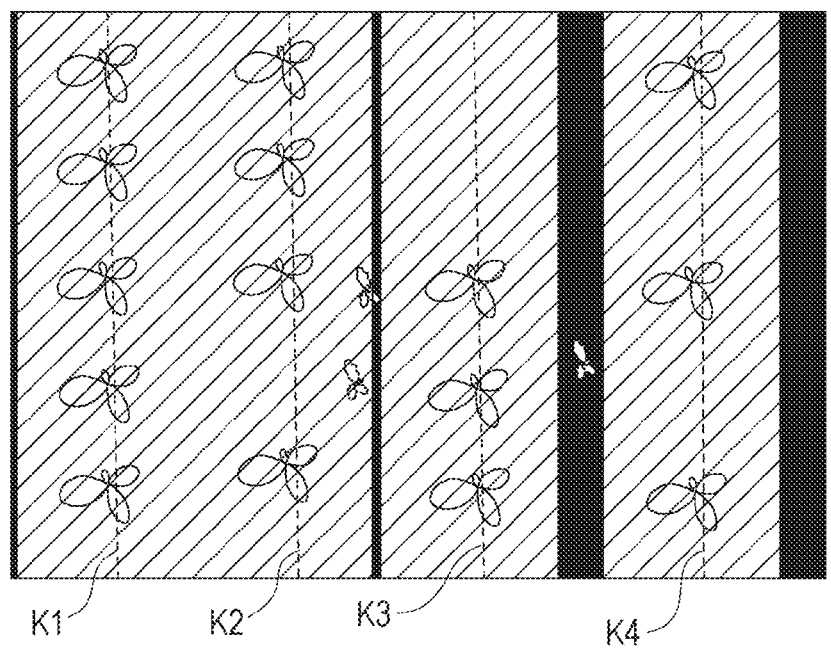
FIG. 14 is an explanatory diagram of an effective range of a row according to a third embodiment.

In a case where rows are arranged at equal intervals, with respect to an arbitrary row, an effective range of the row can be indicated with reference to a half distance between the rows. For example, in FIG. 14, on the image in the image data as a processing target, a range included within a half distance between rows from center lines of the rows indicated by broken lines K1, K2, K3, and K4 is shaded, and a portion that does not become a shaded portion is black. This black portion can be considered as a region where no planting is performed.

Figure 15:
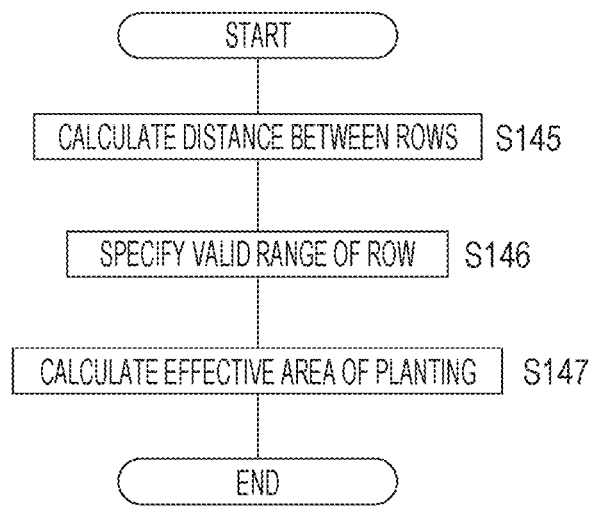
FIG. 15 is a flowchart of a processing example of the third embodiment.

Therefore, it is conceivable that the CPU 51 performs a process as illustrated in FIG. 15 as one process thereof at the time of calculating the output information in step S140.

In step S145, the CPU 51 calculates the distance between the rows. If the row interval is calculated as described above as the process (P3) in step S130 of FIG. 6, this row interval may be used.

In step S146, the CPU 51 specifies an effective range of the row. For example, a portion included within a half distance between rows from center lines of the rows is set as the effective range. That is, it is a shaded portion in FIG. 14.

In step S147, the CPU 51 calculates an effective area of planting. This is to determine the area of the effective range excluding the black portions.

The CPU 51 calculates the effective area of the planting thus obtained as one piece of output information, and outputs the effective area in step S150.

The effective area of the planting is an area excluding a portion where the planting is not performed among the rows, and for example, by outputting the effective area together with information such as the number of crops, the effective area becomes information useful for farm field management.

Furthermore, if the image capturing environment, specifically, the altitude at a time of image capturing, an angle of view of the camera, an image capturing angle of the camera, and the like can be acquired from the tag information, an image capturing area in a case where the farmland is a flat surface can be calculated. The crop area can also be calculated from this image capturing area and the effective range of the row.

The above method is preferably used to obtain a correct crop area when a region other than the field, for example, a footpath, a water channel, or the like is shown in the image.

7. Fourth Embodiment

A fourth embodiment is an example in which a non-straight row can be handled.

In the first embodiment, the example in which row candidates are calculated by straight lines has been described, but the rows are not necessarily straight lines. Particularly at an edge of a farm land, the row may be bent along the shape of the periphery of the farm land. For example, a row 301 as illustrated in FIG. 2B also exists. Accordingly, it is desirable to be capable of detecting a curved row having a curved portion.

In order to detect the curved row, it is only required to detect a curve. The curve can also be detected by Hough transform or RANSAC described in the first embodiment. However, while only two parameters of inclination and intercept are required in a case of a straight line, the number of parameters increases to three in a case of a quadratic curve and four in a case of a cubic curve, and in the Hough transform or RANSAC, the dimension of the parameter for searching increases, and thereby causes a processing time to be enormous.

Accordingly, the image is divided, and the row described in the first embodiment is detected for each divided image.

Figure 16:
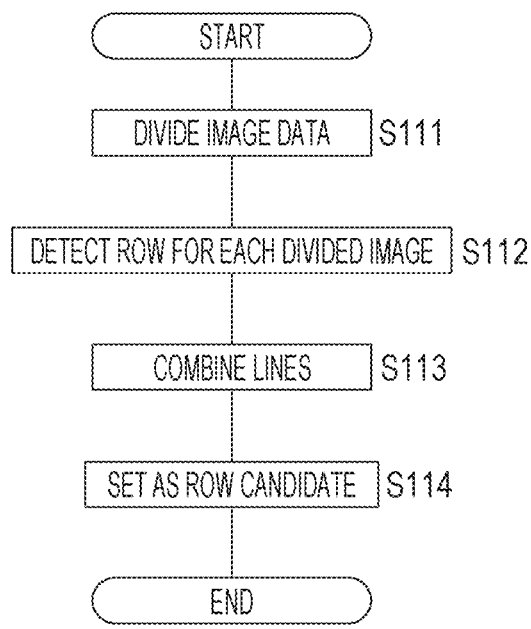
FIG. 16 is a flowchart of a processing example of a fourth embodiment.

FIG. 16 illustrates a processing procedure. The CPU 51 performs processing of FIG. 16 in step S110 of FIGS. 5 and 6.

In step S111, the CPU 51 divides the image data of design into a plurality of regions. The number of divisions is arbitrary, but for example, a rectangular image may be divided into 4, 9, 16, 32, 64, and the like.

In step S112, the CPU 51 detects, for each of the divided regions, a straight line as an arrangement of crop-like regions, that is, approximates the straight line with short straight lines to obtain a straight line having a possibility of being a row in the region.

In step S113, the CPU 51 combines the straight lines detected in the respective regions in a state where the front, back, left, and right relationships in the original image are matched. That is, a curve is expressed by connecting short straight lines found by approximation in each region. Connection of the straight lines between divided images is performed by associating straight lines at close positions with each other between divided image ends with each other.

In step S114, the CPU 51 sets the connected lines as row candidates. For example, row candidates represented by a combination of segments of straight lines with short portions of curves can be set. The row candidate set in this manner undergoes the processing of step S120 in FIG. 5 (steps S121 to S124 in FIG. 6), and a row is determined in step S130.

With the above processing, a row including a curve can be detected by relatively easy processing.

Note that, in the above method, in a case where there are many curves, a case where a curvature of a curve is large, or the like, a larger number of divisions of the image is more advantageous for accurate row plotting. Therefore, it is also conceivable to change the number of divisions of the image in order to perform appropriate processing according to the states of rows of the farm field 300 to be sensed.

The image may be divided simply by cutting out the image, or by cutting out while overlapping a divided image. To connect straight lines in a case of overlapping, it is only required to use a distance between straight lines in an overlapping region instead of a distance at an image end.

Furthermore, an approximate curve of a row formed by a plurality of detected straight lines may be calculated by least square approximation from a crop position on the row.

8. Fifth Embodiment

A fifth embodiment is an example of using map information of the farm field 300.

While crops of the entire image are detected in the first embodiment, the position of the imaging device 220 (position of the flying object 200) when an image is captured and a map of an effective region of the farm field 300 owned by a farmer are superimposed to obtain an effective region of the field, and a row and crops are detected only in the effective region.

Figure 17:
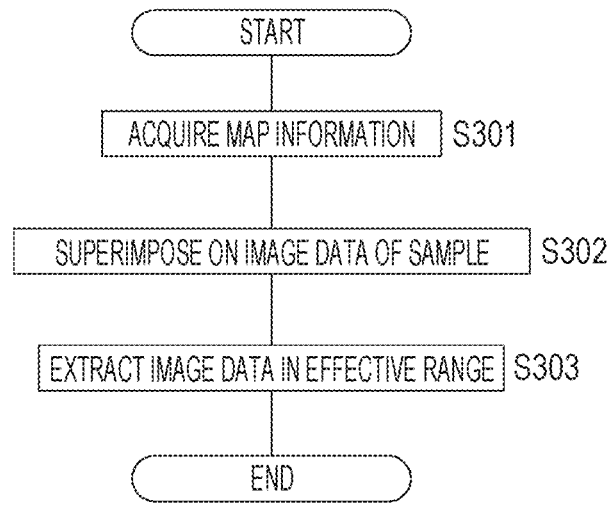
FIG. 17 is a flowchart of a processing example of a fifth embodiment.
Figure 18:
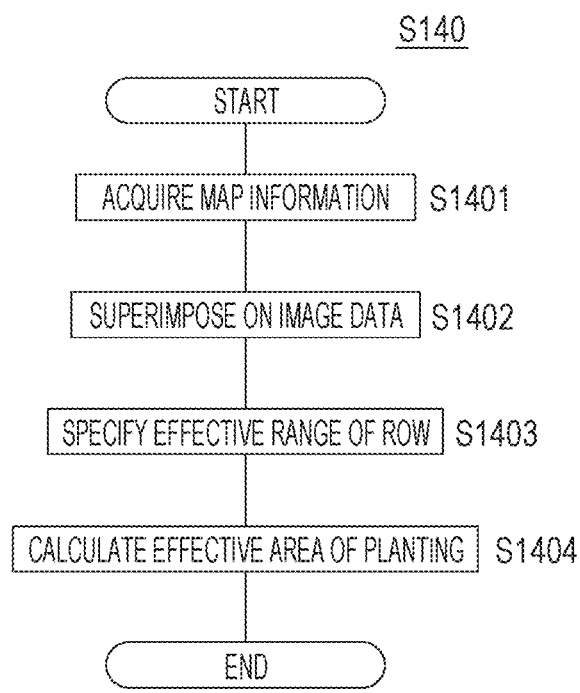
FIG. 18 is a flowchart of another processing example of the fifth embodiment.

Processing examples illustrated in FIGS. 17 and 18 are conceivable.

In processing of FIG. 17, the CPU 51 acquires map information in step S301.

In step S302, the CPU 51 obtains an image capturing range from information such as position information, an angle of view, and an image capturing angle for each of the plurality of pieces of acquired image data, and plots the image capturing range on a map. The plurality of pieces of image data mentioned here is, for example, each piece of image data obtained by periodic image capturing while moving the flying object 200 in one flight. That is, the image is an image as a sample for sensing.

In step S303, the CPU 51 extracts only image data within an effective range that can be determined by the map. It is assumed that the extracted image data can be image data as a processing target in FIGS. 5 and 6, and the like.

That is, by plotting the image capturing range of a plurality of pieces of image data as a sample on the map information, for example, it is possible to distinguish image data in which the image capturing range is a place where no row exists, such as a footpath or outside of the farm field. Such image data is prevented from being set as a processing target for counting crops.

FIG. 18 is an example applicable to, for example, the processing of step S140 of FIG. 5. In particular, the example can be processing used in a case of obtaining the effective area of planting.

For example, it is assumed that the CPU 51 performs processing up to step S130 in FIG. 5 on one image as a processing target, and performs processing of calculating output information in step S140. At this time, the processing of FIG. 18 is also performed to obtain the effective area of planting.

In step S1401, the CPU 51 acquires the map information.

In step S1402, the CPU 51 superimposes the image data as the current processing target on the map information. That is, it is processing such that the image capturing range of the image data is projected on the map.

In step S1403, the CPU 51 specifies the effective range of the row. This specifies a range in which rows are formed in the image capturing range. For example, on the map, a range in which a row is formed is specified by excluding regions of a footpath and outside of the farm field 300.

In step S1404, the CPU 51 calculates an effective area of planting. That is, only the effective range of the row in the image data as the processing target is the effective area of the planting in the image.

The effective range thus obtained can be used as the effective area described in the third embodiment.

9. Sixth Embodiment

In the first embodiment, the number of crops on one piece of image data is obtained. Reliability of a value such as the number of crops may be increased by using an average value or a median value of processing results of a plurality of pieces of image data.

The plurality of pieces of image data referred to herein may be image data obtained by capturing images of different places in the vicinity of the same place while moving by the imaging device 220 mounted on the flying object 200, or may be image data obtained by capturing images of the same place at different dates and times.

Figure 19:
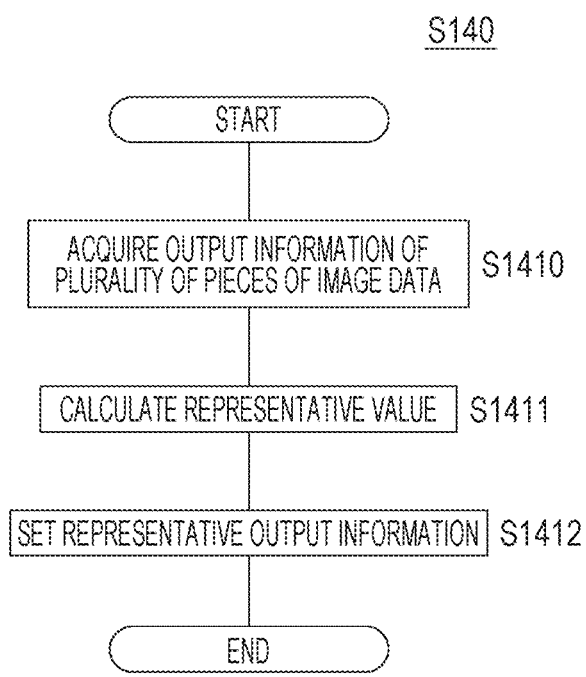
FIG. 19 is a flowchart of a processing example of a sixth embodiment.

FIG. 19 illustrates a processing example. This is, for example, one of processing examples performed in step S140 in FIG. 5.

In step S1410, the CPU 51 acquires output information of a plurality of pieces of image data. For example, the number of crops calculated from a plurality of pieces of image data, the number of crops per unit area, a crop ratio, and the like.

In step S1411, the CPU 51 calculates a representative value. For example, in a case of the number of crops, an average value, a median value, a centroid value, or the like of the number of crops calculated from a plurality of pieces of image data is obtained and used as a representative value.

In step S1412, the CPU 51 sets the obtained representative value as representative output information.

For example, in a case where the processing of FIG. 5 is performed for each required number of pieces of image data, it is conceivable that such processing is performed in step S140 at the time of processing for last image data, and representative output information is generated and output.

10. Seventh Embodiment

A seventh embodiment is an example in which information obtained from other image data is used.

For example, in processing of the first embodiment in FIG. 6, the crop size, the crop interval, the row interval, and the like are separately obtained by image processing for each piece of image data.

On the other hand, in a case where a plurality of images is captured in the same farm field 300 in the same period or with the same equipment in the flying object 200, it is conceivable that the crop size, the crop interval, the row interval, and the like are substantially the same.

Accordingly, a crop size and a row interval detected from one of a plurality of pieces of image data captured or a part of the plurality of pieces of image data (in a case where the part of the plurality of pieces of images is used, an average value, a median value, a centroid value, and the like of each of the crop size, the crop interval, the row interval, and the like) may be applied to other images.

Figure 20:
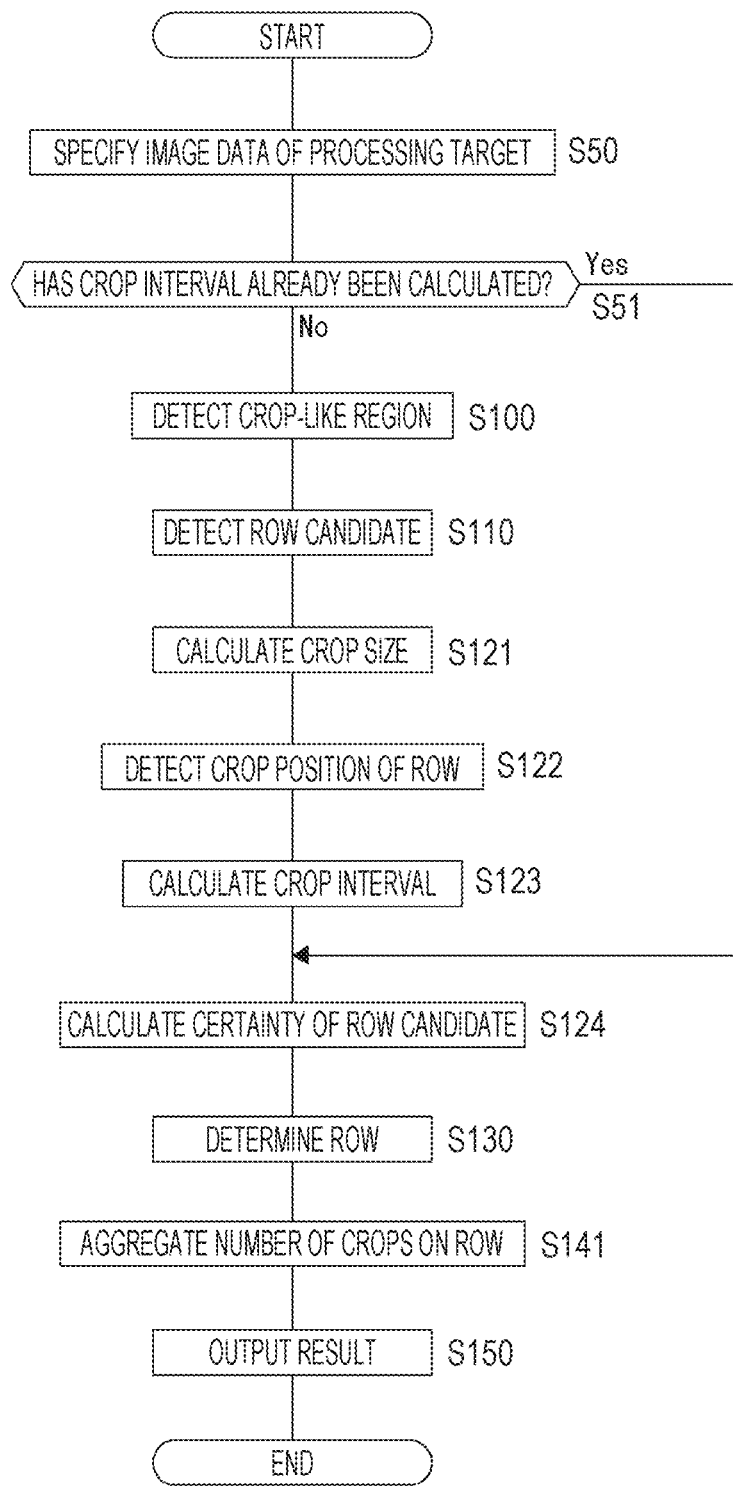
FIG. 20 is a flowchart of a processing example of a seventh embodiment.

FIG. 20 illustrates a processing example. This is a processing example obtained by modifying FIG. 6, and is obtained by adding step S51.

After specifying one piece of image data as a processing target in step S50, the CPU 51 checks whether or not the crop interval has already been calculated in other image data in step S51.

The other image data mentioned here is, for example, image data obtained by capturing an image of the same farm field 300 at the same time, such as other image data obtained by image capturing in the same flight.

If the crop interval has already been calculated, the CPU 51 proceeds to step S124 and subsequent steps, and determines a row in step S130 by obtaining the certainty of the row.

If the crop interval has not yet been calculated, the CPU 51 obtains the crop interval in the processing from step S100 to step S123, and then proceeds to step S124 and subsequent steps.

By such processing, efficiency of processing calculation can be improved.

11. Eighth Embodiment

An eighth embodiment is an example in which values of a crop size, a crop interval, a row interval, and the like calculated from image data are replaced with representative values when the values become inappropriate values for some reason.

In the eighth embodiment, as in the first embodiment, all the processes in FIG. 6 are performed for each piece of image data.

Then, a representative value (an average value, a median value, a centroid value, or the like) of the crop size, the crop interval, the row interval, and the like detected for each piece of image data is calculated, and image data for which a calculation result largely deviates from the values is obtained is reprocessed using the representative values of the crop size, the crop interval, or the row interval.

Figure 21:
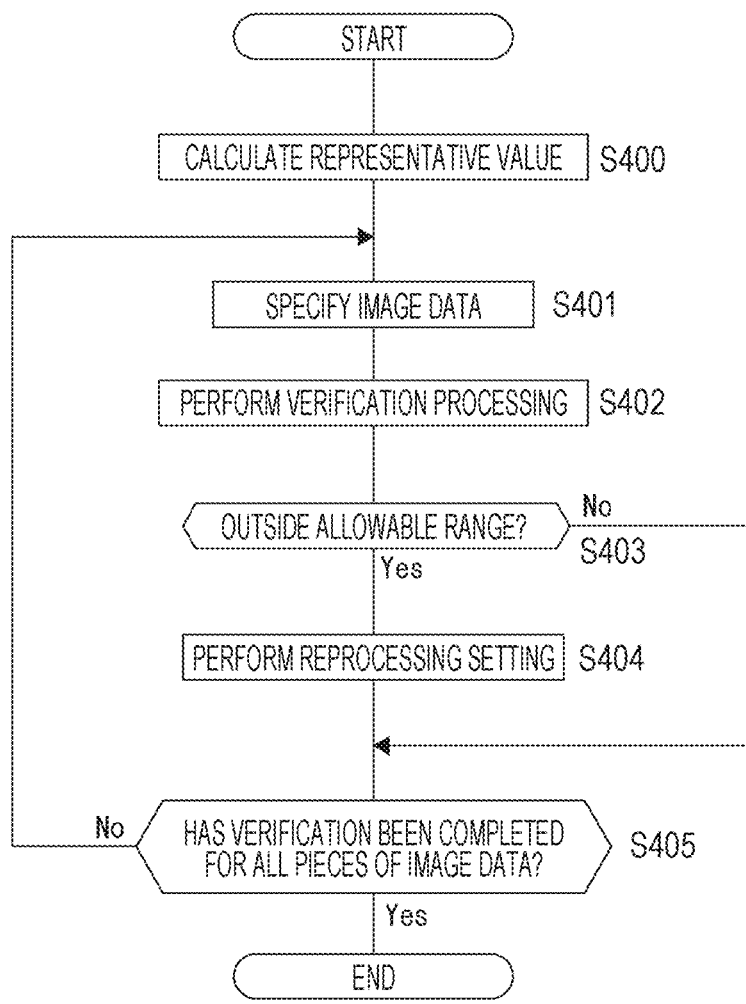
FIG. 21 is a flowchart of a processing example of an eighth embodiment.

FIG. 21 illustrates a processing example. For example, the CPU 51 performs processing from step S50 to step S141 in FIG. 6 for each piece of image data. However, it is conceivable that step S150 is not executed at that time.

Then, when the processing from step S50 to step S141 in FIG. 6 is completed for all pieces of image data, the verification processing in FIG. 21 is performed.

In step S400, the CPU 51 calculates the representative values.

In this case, the CPU 51 acquires values of a crop size SS and a crop interval obtained for each piece of image data, and calculates the representative values thereof. Here, the all pieces of image data mean all pieces of image data employed as a processing target. For example, they mean all pieces of image data which are employed once as the processing target in the processing of FIG. 6 as all or part of a plurality of pieces of image data obtained in one flight.

After obtaining the representative value, the CPU 51 specifies one piece of image data to be verified in step S401.

In step S402, the CPU 51 performs verification processing on the specified one piece of image data. Specifically, it is determined whether or not the value of the crop size SS calculated in the image data is within an allowable range that is set with reference to the representative value of the crop size SS. Furthermore, it is determined whether or not a value of the crop interval calculated in the image data is within an allowable range that is set with reference to the representative value of the crop interval.

Of course, in a case where the row interval is obtained, the determination may be similarly performed for the row interval.

In a case where a value outside the allowable range is detected as a determination result, the CPU 51 proceeds from step S403 to step S404, and sets the image data as a reprocessing target.

In step S405, it is checked whether the above processing has been completed for all the pieces of image data, and if not completed, the process returns to step S401 to verify the next image data.

When the above verification is completed for all the pieces of image data, the CPU 51 ends the processing of FIG. 21.

After such verification processing, the CPU 51 performs the processing from step S50 to step S141 in FIG. 6 again for the image data that is the reprocessing target. At that time, the representative value is applied to the values of the crop size SS and the crop interval within the allowable range to perform the processing.

For image data that is not the reprocessing target, the output information (for example, the number of crops, the number of crops per unit area, a crop ratio, a predicted harvest amount, and the like) obtained in the initial processing is set as valid output information as it is. For the image data that is the reprocessing target, output information obtained by reprocessing is set as valid output information.

In this manner, it is possible to prevent that the crop size, the crop interval, the row interval, and the like, which are originally considered not to have a large change, greatly fluctuate for some reason, and consequently result in an incorrect value in the output information such as the number of crops, the number of crops per unit area, and the crop ratio.

12. Ninth Embodiment

A ninth embodiment is an example corresponding to crops planted in very close proximity, called "double".

Figure 22:
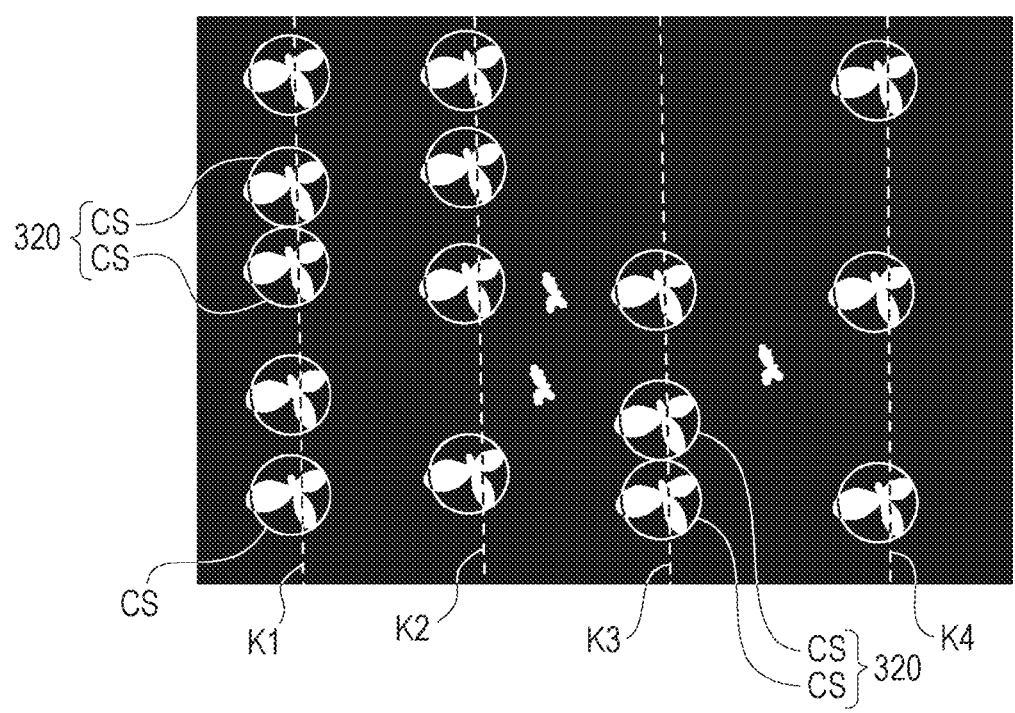
FIG. 22 is an explanatory diagram of a state called double according to a ninth embodiment.

In the first embodiment, the positions of crops on a row are detected, and the number of crops is aggregated. However, as illustrated in FIG. 22, the positions of some crops may be very close to each other. For example, there are crops indicated by a pair of crop positions CS indicated as a double 320.

In a case where there are such crops at positions close to each other, if the crops grow as they are, the crops may compete with each other for nutrients and sunshine, and reduce the harvest amount of each crop. In order to avoid such a situation, it is only required to present positions of two crops close to each other and prompt a countermeasure.

Figure 23:
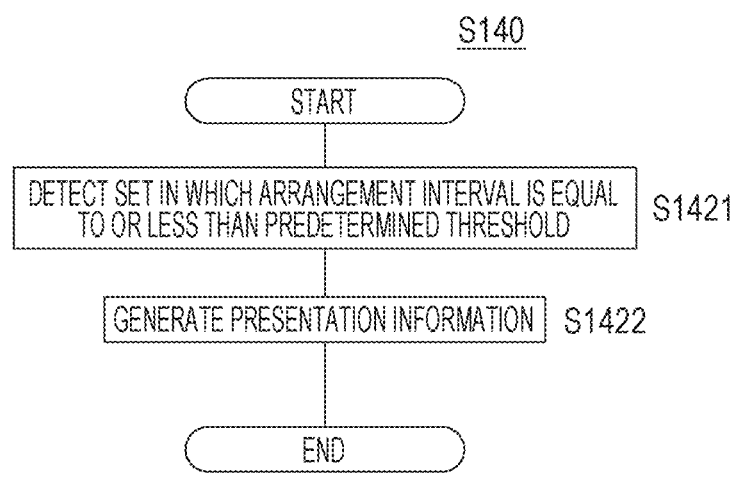
FIG. 23 is a flowchart of a processing example of the ninth embodiment.

Accordingly, the CPU 51 performs the process of FIG. 23 in step S140 of FIG. 5, for example.

In step S1421, the CPU 51 detects a set of crops in which an arrangement interval is equal to or less than a predetermined threshold. That is, a set of crops in a state of the double is detected. The predetermined threshold mentioned here is an appropriate value for determining the double 320, such as a value equal to or less than ⅓ with reference to the calculated crop interval. The predetermined threshold may be input by the user or may be set in advance.

In step S1422, the CPU 51 generates information presenting the detected double 320.

Figure 24:
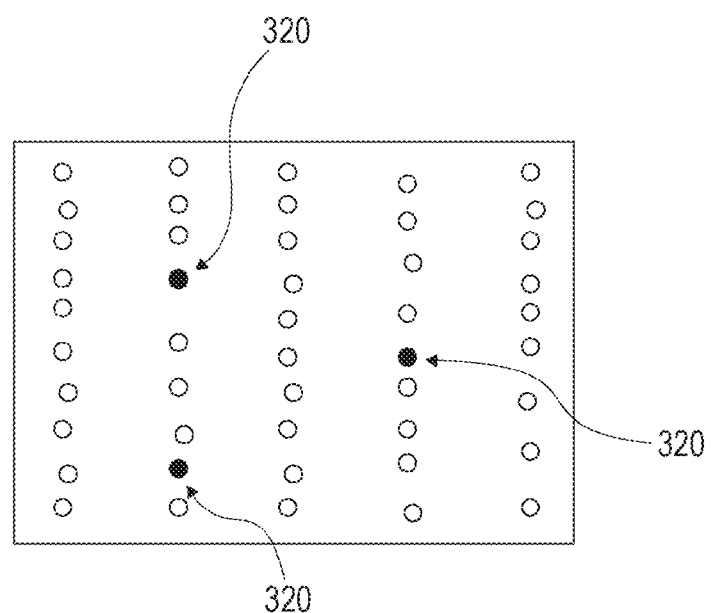
FIG. 24 is an explanatory diagram of a double display example according to the ninth embodiment.

For example, an image as illustrated in FIG. 24 is generated as an image indicating positions of crops, and an image in which the color of a portion of the double 320 is changed from that of normal crops or a shape of marking is changed is generated.

By using such an image as the output information, the manager of the farm field 300 can easily recognize and deal with crops in a state of the double 320.

However, the state of the double 320 may be left as it is. In that case, it is necessary to make a correction to the prediction of the harvest amount.

Figure 25:
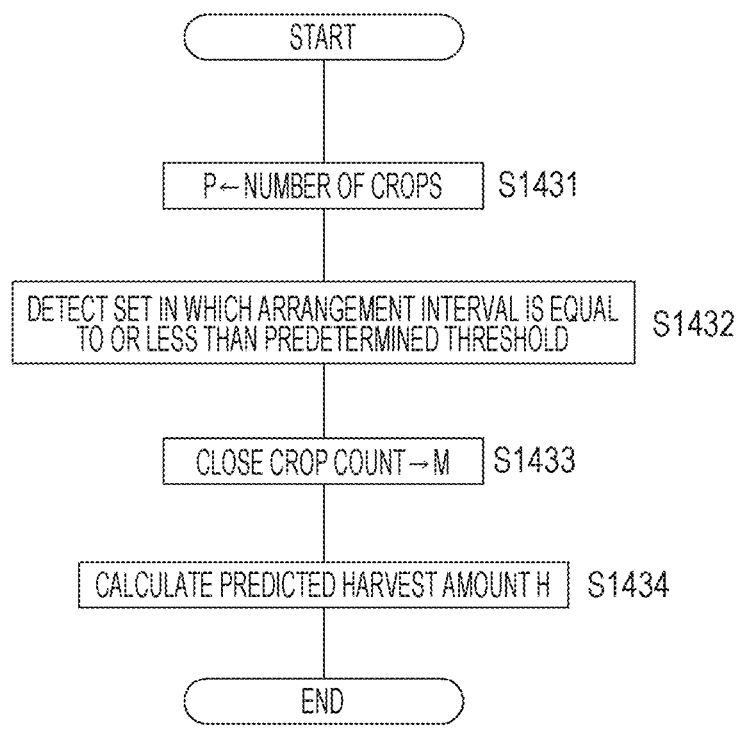
FIG. 25 is a flowchart of another processing example of the ninth embodiment.

Therefore, for example, the processing of FIG. 25 is performed in step S140 of FIG. 5.

In step S1431, the CPU 51 acquires the counted number of crops P.

In step S1432, the CPU 51 detects a set of crops in which an arrangement interval is equal to or less than the predetermined threshold. That is, a set of crops in a state of the double is detected. The predetermined threshold is similar to that in the case of FIG. 23 described above.

Then, in step S1433, the CPU 51 acquires the number M of close crops, that is, the number M of crops as the double 320. This is twice the number of sets of crops in which an arrangement interval is equal to or less than the predetermined threshold (because of two crops in one set).

In step S1434, the CPU 51 calculates a predicted harvest amount.

In general, a prediction of a harvest amount can be calculated by (number of crops)×(average harvest amount per crop). However, for crops at positions close to each other, it is only required to perform calculation by multiplying a constant smaller than 1 (for example, 0.7) as a correction count. Specifically, assuming that the number of crops is P, the number of crops located close to each other is M, the average harvest amount per crop is K, and the correction count of the average harvest amount of crops located close to each other is p, the harvest amount H can be predicted by the following equation.

$$H = K(P-M) + \mu KM \quad (3)$$

With such processing, it is possible to calculate the predicted harvest amount with high accuracy in consideration of the crops in a state of the double.

13. Tenth Embodiment

In the tenth embodiment, for example, the row determined in the course of the processing of FIG. 6 can be checked and operated by the user by the function of the UI control unit 6.

Figure 26:
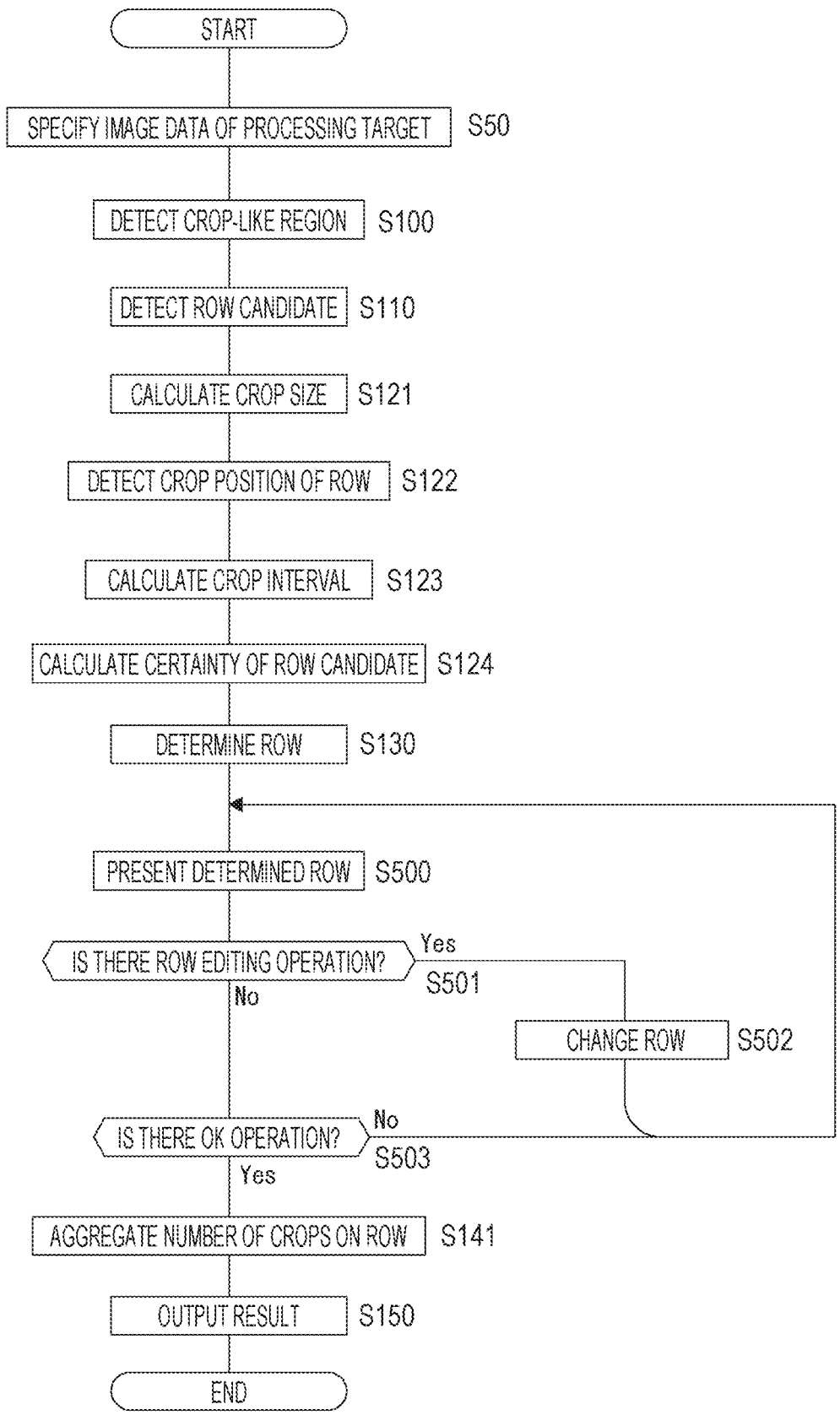
FIG. 26 is a flowchart of a processing example of a tenth embodiment.

FIG. 26 illustrates a processing example. This is obtained by adding steps S500 to S503 to the processing of FIG. 6.

After determining a row in the processing up to step S130, the CPU 51 performs processing of presenting the determined row to the user in step S500.

Figure 27A:
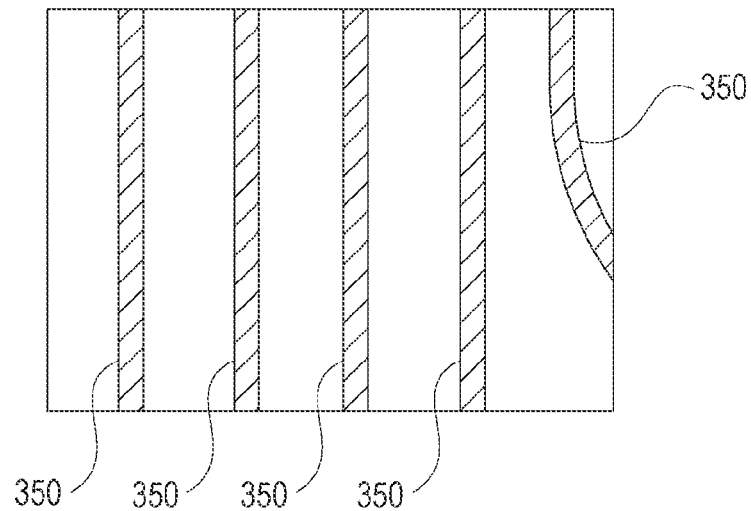
FIGS. 27A and 27B are explanatory diagrams of an example of a user interface according to the tenth embodiment.

For example, as illustrated in FIG. 27A, presentation image data in which a row presentation line 350 indicating a determined row is superimposed on the image data is generated and displayed on the display unit 56 or an external device.

Then, in step S501, a user operation is waited for.

That is, the CPU 51 performs UI processing so that the user can designate the row presentation line 350 on the image and perform an editing operation such as deletion thereof or line correction.

In a case where the user performs the editing operation of the row, the CPU 51 changes the row in step S502. For example, in a case where the user performs an operation of specifying and deleting a certain row presentation line 350, processing of excluding the row from determined rows is performed, and the row is presented.

Figure 27B:
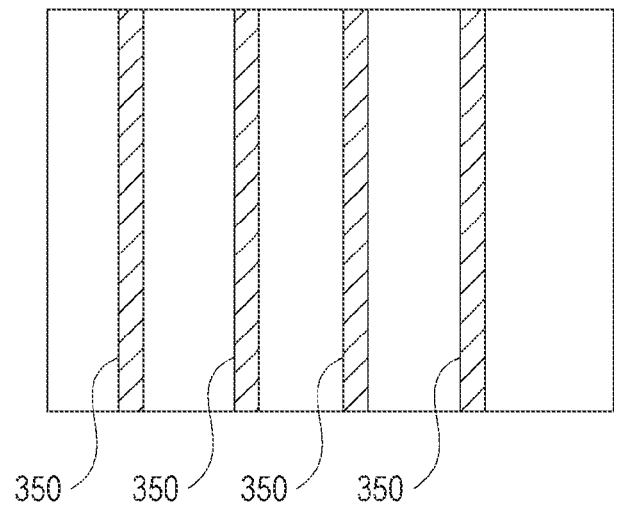

For example, in a case where the user performs an operation of specifying and deleting a curved row presentation line 350 at a right end with respect to the image of FIG. 27A, the CPU 51 determines that a portion corresponding to the row presentation line 350 is not a row. Furthermore, as illustrated in FIG. 27B, the image in which the row presentation line 350 is erased is presented to the user by the display unit 56 or the like.

In a case where the user performs an OK operation, the CPU 51 maintains the determined states of lines as rows indicated by row presentation lines 350 at that time, and proceeds from step S503 to step S141.

By performing such processing, the user can check the automatic detection of the row, and for example, it is possible to cope with a case where accuracy of the row detection decreases due to the state of the farm field 300, the type of the crop, and the like.

14. Summary and Modification Example

In the above embodiments, the following effects can be obtained.

An information processing device 1 according to the embodiment includes a row determination unit 4 that performs crop detection in image data obtained by capturing an image of a farm field 300, and determines a row that is a line in which a crop is planted in the image data on the basis of a result of the crop detection.

Thus, the row can be automatically determined from the image data obtained by capturing an image of the farm field 300. Therefore, labor such as user input and data transfer for specifying the row is unnecessary, and for example, a system having extremely high usability can be achieved as a system for checking a state of a farm field.

In the embodiment, an example has been described in which the row determination unit 4 detects a row candidate on the basis of a result of the crop detection, calculates a certainty as a row on the basis of a crop interval in each row candidate, and determines a row on the basis of a calculation result of the certainty (see FIG. 6).

Regarding determination of a row, first, a portion where a crop (plant) exists can be a row candidate. By using the presence of a crop as a reference, it is possible to eliminate missing detection of a certain row by obtaining a large number of candidates of rows (arrangement of crops). Then, row detection with high accuracy can be achieved by calculating the certainty from row candidates. In particular, it is easy to obtain the certainty by using the crop interval as a reference. Of course, considering that rows are arranged in parallel, accuracy can be further improved.

Then, by accurately detecting the row on the image, it is possible to distinguish a randomly growing plant such as a weed from a crop.

As described in detail in the first embodiment, the row determination unit 4 calculates a crop size SS from a size of a crop-like region near an upper portion of a row candidate, detects a crop candidate on the row candidate from a calculated crop size SS, calculates a crop interval on the image data from an interval between detected crop candidates, determines a certainty of the row candidate from a determined crop interval, and excludes the row candidate determined to be erroneously detected using a determined certainty. That is, an erroneously detected row candidate is excluded. Then, processing of determining a row is performed.

In a case where the certainty of the row candidate is determined by the crop interval, it is also important that accuracy of the crop interval is high. In the processing of the embodiment, the crop candidate on the row candidate is detected from an estimated crop size. That is, it is possible to determine a row with higher accuracy by detecting the crop interval by adding a growth size, and thereby determine the certainty of the row candidate.

As described in the fourth embodiment, the row determination unit 4 determines a row including a curve in the image data.

That is, the row is not limited to a straight line, but a curved or partially curved row is also detected and determined as a row on the image data.

The row in the farm field 300 is not necessarily always a straight line. A straight row may bend at an end of the farm field 300 or the like. Furthermore, depending on the shape of the farm field 300, a path at the time of sowing, obstacles, and the like, the row may be partially curved, or the row may be formed in a spiral shape or a concentric shape, for example.

It is possible to perform row determination that matches the actual situation by performing row determination including a curved state.

As described in the fourth embodiment, the row determination unit 4 can set a row candidate including a curve by dividing the image data, perform row detection for each divided image, and combine lines of the row detection of divided images (see FIG. 16).

By dividing the image, a portion of the row can be approximated by a short straight line. By connecting these short approximate straight lines, a row including a curve can be detected by simple processing, and a processing load of the system can be reduced. For example, in a case where approximation of a quadratic curve or a cubic curve is performed, in Hough transform or RANSAC, a dimension of a parameter for searching increases and thereby causes a processing time to be enormous, but such a processing load can be reduced and a row of the curve can be detected.

The information processing device 1 according to the embodiment includes an output information generation unit 5 that generates output information regarding growth of a crop by using information of a row determined by the row determination unit 4.

The output information regarding the growth of a crop is, for example, information that can be used for management of the farm field 300, such as the number of crops, the number of crops per unit area, predicted harvest amount, and crop ratio.

By using the information of the row on the image, it is possible to distinguish whether a plant on the image is a crop on the row or a weed other than the row. Therefore, for example, the calculation of the number of crops, the number of crops per unit area, the predicted harvest amount, the crop ratio, and the like can be accurately performed.

Then, the output information generation unit 5 performs calculation of a state of the farm field 300, for example, the number of crops of a unit area, the predicted harvest amount, the crop ratio, and the like, and thereby a system that provides information indicating the state of the farm field useful for a staff of the farm field can be constructed.

In the first embodiment, an example has been described in which the output information generation unit 5 counts a number of crops in the row determined by the row determination unit 4 and counts a total number of crops present in image data.

By counting the crops after determining the row, a plant that is out of the row, that is, a weed, and the like are not erroneously included in the count, and accuracy of the crop count can be improved.

Then, if the total number of crops in the image data can be known, the number of crops per unit area can be calculated by using the ratio of an area of a range captured in the image to the unit area (for example, one acre) as a coefficient. By accurately determining the row and then counting crops, the calculated number of crops per unit area is also an accurate number.

As described in the second embodiment, there is an example in which the output information generation unit 5 counts missing positions of a crop using a crop interval obtained by the row determination unit 4.

By obtaining the crop interval, it is possible to estimate a missing position as a position where there is no crop that should originally exist.

Then, by counting the missing position, it is possible to detect and aggregate a position where the crop has not germinated even though the crop should originally germinate, and it is possible to use the count as information used for farm field management.

Furthermore, as described in the second embodiment, the output information generation unit 5 may count missing positions of a crop using a crop interval obtained by the row determination unit 4, and calculate a crop ratio that is a ratio between an ideal number of plantings and actual plantings using a counting result of missing positions of the crop (see FIG. 12).

The ideal number of plantings is the number of crops aggregated in a case where the crops are grown in all positions where seeds are sown. Then, by obtaining the missing positions, the ideal number of plantings is obtained, and thereby a ratio to actual plantings can be obtained.

The crop ratio is a ratio of germinated crops, and can also be rephrased as, for example, a germination ratio or a germination rate.

The number of crops obtained by counting the number of crops on the row depends on the area (image capturing area) of the farm field captured in the image data, and thus may be difficult to handle as information for farm management. This is because the image capturing area varies depending on the altitude of the flying object 200 and a lens state (angle of view) of the imaging device 220, and thus the number of crops to be aggregated also varies.

Accordingly, there is a case where it is desirable to calculate the crop ratio that does not depend on the image capturing area.

By obtaining the crop ratio, it is possible to provide an index for evaluating a crop state of the farm field without depending on the image capturing area. For example, the index is information suitable in a case where the information of the number of crops is difficult to handle.

As described in the third embodiment, the output information generation unit 5 may calculate an effective area of planting on the basis of a position of the row determined by the row determination unit 4 (see FIG. 15).

The effective area of planting is an area of a range where planting is actually carried out, in other words, an area excluding a range where planting is not performed in the farm field.

By determining the row, the effective area of planting can be obtained from a row interval.

Furthermore, by obtaining the effective area of planting, it is possible to obtain a harvest rate and a crop ratio according to an actual row range, and to provide useful information by the farm field management by using the effective area excluding a footpath, a water channel, and the like when they are shown in an image. For example, the number of crops per unit area, a crop ratio, an expected harvest amount, and the like can be obtained in accordance with a more actual state of the farm field 300.

As described in the sixth embodiment, the output information generation unit 5 calculates representative output information using output information obtained from each of a plurality of pieces of image data (see FIG. 19).

By generating the representative output information as an average value, a median value, a centroid value, or the like of the output information obtained from each of the plurality of pieces of image data, it is possible to further increase reliability of the information.

As described in the ninth embodiment, the output information generation unit 5 detects a set of crops in which a value of an arrangement interval is equal to or less than a predetermined value, and generates output information presenting a corresponding set of crops (See FIGS. 22, 23, and 24).

Crops called "double" in the farm field management and grow very closely on a row may degrade growth and reduce a harvest amount. Accordingly, crops having close arrangement intervals are presented as information used for the farm field management. Thus, a manager can easily cope with "double".

As described in the ninth embodiment, the output information generation unit 5 may detect a number of crops in which a value of an arrangement interval is equal to or less than a predetermined value, and calculate a predicted harvest amount reflecting the number (see FIG. 25).

Thus, the predicted harvest amount can be calculated in consideration of the number of crops in the "double" state, and information accuracy can be improved.

As described in the seventh embodiment, in the information processing device 1, presence of calculated data for the image data of the same farm field may be checked, and processing may be performed using the calculated data in a case where the calculated data exists (see FIG. 20).

For example, in a case where there is a plurality of pieces of image data captured by a series of image capturing operations or in substantially the same period for a certain farm field 300, in a case where there is calculated data such as a crop interval, a growth size, and a row interval calculated for one piece of image data, the calculated data can also be used in row determination processing and output information calculation processing for other image data.

As illustrated in FIG. 20, if the crop interval calculated for one piece of image data is used, the row determination unit 4 can omit, for example, the processing from step S100 to step S123 in FIG. 6 for the other pieces of image data, so that the processing of row determination can be made efficient.

As another example, even if the crop size SS calculated for one piece of image data is used, the row determination unit 4 can omit, for example, the processing from step S100 to step S121 in FIG. 6 for the other pieces of image data, so that row determination processing can be made efficient.

As still another example, if the calculated data of the distance between rows calculated for one piece of image data is used, the output information generation unit 5 can omit the processing of step S145 in FIG. 15, for example, for the other pieces of image data, and thus the processing of the effective area calculation can be made efficient.

As described in the eighth embodiment, in a case where calculated data calculated from the image data is a value outside an allowable range based on representative calculated data obtained for other image data of the same farm field 300, a value of the representative calculated data can be applied (see FIG. 21).

In a case where the crop size and the crop interval calculated for one piece of image data are values outside the normally assumed ranges, it is considered that the calculated value is some error, and row determination processing and effective area calculation processing can be optimized by using the representative calculated data.

As described in the fifth embodiment, an effective range of planting in the image data can be determined by using map data of the farm field 300 (see FIGS. 17 and 18).

For example, the effective range in the image data is determined using map data of a farm field owned by the farmer.

Since the shape of the farm field 300, a footpath, and the like are usually fixed, in a case where map data is present, the map data can be effectively used. By inputting the map data, it is possible to determine whether or not the image data shows a range of planting of the farm field 300, and a footpath in the image data, and the like, and the map data can be used for row determination processing by the row determination unit 4 and calculation of an effective area of planting by the output information generation unit 5.

In the example described in the tenth embodiment, a UI control unit 6 that performs control to present the row determined by the row determination unit 4 and detects a user operation is provided, in which the row determination unit 4 changes the row determination according to a detected user operation (see FIGS. 26, 27A, and 27B).

By presenting the row 301 on the image data or the like, the user can check the state of the row automatically detected from the image by the information processing device 1. In a case where there is any erroneous detection, the row can be corrected by performing a necessary operation. Thus, an accurate row is specified, and accuracy of output information such as the number of crops can be improved.

In the embodiment, an example has been described in which the imaging device 220 is mounted on the flying object 200 capable of being wirelessly operated or operating autonomously.

Examples of the flying object 200 capable of being wirelessly operated or operating autonomously include what are called drones, small wireless-piloted fixed-wing airplanes, and small wireless-piloted helicopters.

The program of the embodiment causes the information processing device 1 to execute a process of performing crop detection in image data obtained by capturing an image of a farm field 300, and a process of determining a row that is a line in which a crop is planted in the image data on the basis of a result of the crop detection.

That is, the program causes the information processing device to execute the processing described in FIGS. 5, 6, and the like.

Such a program facilitates implementation of the information processing device 1 according to the present embodiment.

Then, such a program can be stored in advance in a recording medium built in a device such as a computer device, a ROM in a microcomputer having a CPU, or the like. Alternatively, the program can be temporarily or permanently stored in a removable recording medium such as a semiconductor memory, a memory card, an optical disk, a magneto-optical disk, or a magnetic disk. Such a removable recording medium can also be provided as what is called package software.

Furthermore, such a program can be installed from the removable recording medium into a personal computer or the like, or can be downloaded from a download site via a network such as a LAN or the Internet.

Note that effects described in the present description are merely examples and are not limited, and other effects may be provided.

Note that the present technology can employ configurations as follows.

(1)

An information processing device including
a row determination unit that performs crop detection in image data obtained by capturing an image of a farm field, and determines a row that is a line in which a crop is planted in the image data on the basis of a result of the crop detection.

(2)

The information processing device according to (1) above, in which
the row determination unit
detects a row candidate on the basis of a result of the crop detection,
calculates a certainty as a row on the basis of a crop interval in each row candidate, and
determines a row on the basis of a calculation result of the certainty.

(3)

The information processing device according to (1) or (2) above, in which
the row determination unit
calculates a crop size from a size of a crop-like region near an upper portion of a row candidate,
detects a crop candidate on the row candidate from a calculated crop size,
calculates a crop interval on the image data from an interval between detected crop candidates,
determines a certainty of the row candidate from a determined crop interval, and
performs processing of determining a row after excluding the row candidate determined to be erroneously detected using a determined certainty.

(4)

The information processing device according to any one of (1) to (3) above, in which
the row determination unit determines a row including a curve in the image data.

(5)

The information processing device according to any one of (1) to (4) above, in which
the row determination unit sets a row candidate including a curve by dividing the image data, performing row detection for each divided image, and combining lines of the row detection of divided images.

(6)

The information processing device according to any one of (1) to (5) above, further including
an output information generation unit that generates output information regarding growth of a crop by using information of a row determined by the row determination unit.

(7)

The information processing device according to (6) above, in which
the output information generation unit
counts a number of crops in the row determined by the row determination unit, and counts a total number of crops present in image data.

(8)

The information processing device according to (6) or (7) above, in which the output information generation unit counts missing positions of a crop using a crop interval obtained by the row determination unit.

(9)

The information processing device according to any one of (6) to (8) above, in which the output information generation unit counts missing positions of a crop using a crop interval obtained by the row determination unit, and calculates a crop ratio that is a ratio between an ideal number of plantings and actual plantings using a counting result of missing positions of the crop.

(10)

The information processing device according to any one of (6) to (9) above, in which the output information generation unit calculates an effective area of planting on the basis of a position of the row determined by the row determination unit.

(11)

The information processing device according to any one of (6) to (10) above, in which the output information generation unit calculates representative output information using output information obtained from each of a plurality of pieces of image data.

(12)

The information processing device according to any one of (6) to (11) above, in which the output information generation unit detects a set of crops in which a value of an arrangement interval is equal to or less than a predetermined value, and generates output information presenting a corresponding set of crops.

(13)

The information processing device according to any one of (6) to (12) above, in which the output information generation unit detects a number of crops in which a value of an arrangement interval is equal to or less than a predetermined value, and calculates a predicted harvest amount reflecting the number.

(14)

The information processing device according to any one of (1) to (13) above, in which presence of calculated data for the image data of the same farm field is checked, and processing is performed using the calculated data in a case where the calculated data exists.

(15)

The information processing device according to any one of (1) to (14) above, in which in a case where calculated data calculated from the image data is a value outside an allowable range based on representative calculated data obtained for other image data of the same farm field, a value of the representative calculated data is applied.

(16)

The information processing device according to any one of (1) to (15) above, in which an effective range of planting in the image data is determined by using map data of the farm field.

(17)

The information processing device according to any one of (1) to (16) above, further including a user interface control unit that performs control to present the row determined by the row determination unit and detects a user operation, in which the row determination unit changes the row determination according to a detected user operation.

(18)

An information processing method including:

performing crop detection in image data obtained by capturing an image of a farm field; and determining a row that is a line in which a crop is planted in the image data on the basis of a result of the crop detection.

(19)

A program causing an information processing device to execute:

a process of performing crop detection in image data obtained by capturing an image of a farm field; and a process of determining a row that is a line in which a crop is planted in the image data on the basis of a result of the crop detection.

REFERENCE SIGNS LIST

1 Information processing device
2 Image acquisition unit
4 Row determination unit
5 Output information generation unit
6 UI control unit
7 Recording control unit
51 CPU
56 Display unit
57 Input unit
59 Storage unit
60 Communication unit
200 Flying object
220 Imaging device
300 Farm field
301 Row
310 Crop
315 Weed
350 Row presentation line

The invention claimed is:

1. An information processing device, comprising
a row determination unit configured to:
    detect a crop-like region in image data of an image of a farm field,
        wherein the farm field includes a plurality of crops;
    detect, as a plurality of row candidates, a first plurality of lines that passes through a plurality of pixels in the image data, wherein
        the detection of the first plurality of lines is based on the detected crop-like region, and
        the plurality of pixels corresponds to the plurality of crops;
    calculate a crop size for each row candidate of the plurality of row candidates based on a size of the crop-like region,
        wherein the crop size is associated with the plurality of crops;
    detect, based on the calculated crop size, crop candidates in each row candidate of the plurality of row candidates;

calculate, based on an interval between the crop candidates, a crop interval associated with the plurality of crops in the image data;

determine a value of certainty of each row candidate of the plurality of row candidates based on the calculated crop interval;

determine an erroneously detected row candidate from the plurality of row candidates based on the determined value of certainty of each row candidate of the plurality of row candidates;

exclude the erroneously detected row candidate from the plurality of row candidates; and determine a correct row from the plurality of row candidates that excludes the erroneously detected row candidate, wherein the correct row is a line of the first plurality of lines that includes a first set of crops of the plurality of crops.

2. The information processing device according to claim 1, wherein the first plurality of lines includes a plurality of curved lines.

3. The information processing device according to claim 1, wherein the row determination unit is further configured to:

divide the image data into a plurality of regions;

detect a second plurality of lines in the plurality of regions based the detected crop-like region; and combining the second plurality of lines.

4. The information processing device according to claim 1, further comprising an output information generation unit configured to generate, based on information associated with the determined correct row, output information regarding growth of the plurality of crops.

5. The information processing device according to claim 4, wherein the output information generation unit is further configured to:

count a number of crops in the first set of crops in the determined correct row; and count a total number of crops in the plurality of crops in the image data.

6. The information processing device according to claim 4, wherein the output information generation unit is further configured to count missing positions of a crop of the plurality of crops based on the calculated crop interval.

7. The information processing device according to claim 4, wherein the output information generation unit is further configured to:

count missing positions of a crop of the plurality of crops based on the calculated crop interval; and calculate, based on the count of the missing positions of the crop, a crop ratio that is a ratio between an ideal number of plantings in the farm field and actual plantings in the farm field.

8. The information processing device according to claim 4, wherein the output information generation unit is further configured to calculate an effective area of planting in the image data based on a position of the determined correct row.

9. The information processing device according to claim 4, wherein the output information generation unit is further configured to calculate representative output information based on the output information associated with each piece of a plurality of pieces of the image data.

10. The information processing device according to claim 4, wherein the output information generation unit is further configured to:

detect a second set of crops of the plurality of crops in which a value of an arrangement interval is equal to or less than a specific value; and generate the output information indicating the second set of crops.

11. The information processing device according to claim 4, wherein the output information generation unit is further configured to:

detect a number of crops in the plurality of crops in which a value of an arrangement interval is equal to or less than a specific value; and calculate a predicted harvest amount reflecting the number of crops.

12. The information processing device according to claim 1, wherein the row determination unit is further configured to:

determine a presence of calculated data for the image data of the same farm field; and determine the correct row based on the calculated data.

13. The information processing device according to claim 1, wherein the row determination unit is further configured to:

calculate specific data from a piece of a plurality of pieces of the image data;

calculate representative data from the plurality of pieces of the image data;

determine, based on the representative data, the specific data includes a value outside an allowable range; and recalculate the specific data based on the representative data and the determination that the value of the specific data is outside the allowable range.

14. The information processing device according to claim 1, wherein the row determination unit is further configured to determine an effective range of planting in the image data based on map data of the farm field.

15. The information processing device according to claim 1, further comprising a user interface control unit configured to:

control presentation of the determined correct row; and detect a user operation, wherein the row determination unit is further configured to change the determined correct row based on the detected user operation.

16. An information processing method, comprising:

detecting a crop-like region in image data of an image of a farm field, wherein the farm field includes a plurality of crops;

detecting, as a plurality of row candidates, a plurality of lines that passes through a plurality of pixels in the image data, wherein the detection of the plurality of lines is based on the detected crop-like region, and the plurality of pixels corresponds to the plurality of crops;

calculating a crop size for each row candidate of the plurality of row candidates based on a size of the crop-like region, wherein the crop size is associated with the plurality of crops;

detecting, based on the calculated crop size, crop candidates in each row candidate of the plurality of row candidates;

calculating, based on an interval between the crop candidates, a crop interval associated with the plurality of crops in the image data;

determining a value of certainty of each row candidate of the plurality of row candidates based on the calculated crop interval;

determining an erroneously detected row candidate from the plurality of row candidates based on the determined value of certainty of each row candidate of the plurality of row candidates;

excluding the erroneously detected row candidate from the plurality of row candidates; and determining a correct row from the plurality of row candidates that excludes the erroneously detected row candidate, wherein the correct row is a line of the plurality of lines that includes a set of crops of the plurality of crops.

17. A non-transitory computer-readable medium having stored thereon computer-executable instructions which, when executed by a computer, cause the computer to execute operations, the operations comprising:

detecting a crop-like region in image data of an image of a farm field, wherein the farm field includes a plurality of crops;

detecting, as a plurality of row candidates, a plurality of lines that passes through a plurality of pixels in the image data, wherein the detection of the plurality of lines is based on the detected crop-like region, and the plurality of pixels corresponds to the plurality of crops;

calculating a crop size for each row candidate of the plurality of row candidates based on a size of the crop-like region, wherein the crop size is associated with the plurality of crops;

detecting, based on the calculated crop size, crop candidates in each row candidate of the plurality of row candidates;

calculating, based on an interval between the crop candidates, a crop interval associated with the plurality of crops in the image data;

determining a value of certainty of each row candidate of the plurality of row candidates based on the calculated crop interval;

determining an erroneously detected row candidate from the plurality of row candidates based on the determined value of certainty of each row candidate of the plurality of row candidates;

excluding the erroneously detected row candidate from the plurality of row candidates; and determining a correct row from the plurality of row candidates that excludes the erroneously detected row candidate, wherein the correct row is a line of the plurality of lines that includes a set of crops of the plurality of crops.

* * * * *